(12) United States Patent
Kawai et al.

(10) Patent No.: US 8,778,472 B2
(45) Date of Patent: Jul. 15, 2014

(54) REFRIGERANT TRANSPORTING HOSE AND POLYAMIDE RESIN COMPOSITION FOR FORMING GAS BARRIER LAYER OF THE SAME

(75) Inventors: Atsushi Kawai, Yokohama (JP); Katsuhiko Tsunoda, Yokohama (JP); Ichiro Aoki, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 153 days.

(21) Appl. No.: 13/260,280

(22) PCT Filed: Mar. 26, 2010

(86) PCT No.: PCT/JP2010/055356
§ 371 (c)(1),
(2), (4) Date: Sep. 24, 2011

(87) PCT Pub. No.: WO2010/110419
PCT Pub. Date: Sep. 30, 2010

(65) Prior Publication Data
US 2012/0021157 A1 Jan. 26, 2012

(30) Foreign Application Priority Data

Mar. 27, 2009 (JP) ................. 2009-079487
May 29, 2009 (JP) ................. 2009-130622
Jun. 2, 2009 (JP) ................. 2009-133251
Jul. 21, 2009 (JP) ................. 2009-170210

(51) Int. Cl.
*B32B 1/08* (2006.01)
*F16L 11/04* (2006.01)

(52) U.S. Cl.
USPC ..... 428/36.91; 428/34.5; 428/34.7; 428/36.4; 428/36.7; 428/36.8; 138/137; 138/141; 138/153; 138/174

(58) Field of Classification Search
USPC .......... 428/34.1, 34.4–34.7, 35.7–36.2, 36.4, 428/36.5–36.92; 138/118, 123–127, 137, 138/140–144, 153, 172, 174
See application file for complete search history.

(56) References Cited

U.S. PATENT DOCUMENTS 5,585,152 A * 12/1996 Tamura et al. ............... 428/35.1
6,156,838 A * 12/2000 Yoshikawa et al. .......... 524/789
2003/0190444 A1 10/2003 Stoppelmann et al.

FOREIGN PATENT DOCUMENTS

CN 1366490 A 8/2002
CN 1789773 A 6/2006
(Continued)

OTHER PUBLICATIONS

Machine translation of specification of JP 8-104806 (Murakami et al.), translation date Apr. 19, 2013.*

(Continued)

*Primary Examiner* — Walter B Aughenbaugh
(74) *Attorney, Agent, or Firm* — Sughrue Mion, PLLC

(57) ABSTRACT

A durable refrigerant transporting hose is provided which includes a gas barrier layer made of a polyamide resin composition, and prevented from being degraded by the refrigerant or compressor oil. A refrigerant transporting hose 1 including a gas barrier layer 2 made of a polyamide resin composition. The polyamide resin composition contains at least one metal compound selected from the group consisting of hydroxides, oxides and carbonates of divalent and trivalent metals in an amount of 1% to 15% by weight relative to the total amount of the metal compound and the polymer component. An olefin elastomer may be added to the polyamide resin composition to enhance the flexibility and durability.

13 Claims, 2 Drawing Sheets

(56) References Cited

FOREIGN PATENT DOCUMENTS

| | | | |
|---|---|---|---|
| CN | 101394993 | A | 3/2009 |
| JP | 04-100858 | A | 4/1992 |
| JP | 04-151087 | | 5/1992 |
| JP | 05-038746 | | 2/1993 |
| JP | 8-104806 | A | 4/1996 |
| JP | 2000-120944 | A | 4/2000 |
| JP | 2001-116173 | A | 4/2001 |
| JP | 2003-171568 | A | 6/2003 |
| JP | 2003-247672 | A | 9/2003 |
| JP | 2004-122794 | A | 4/2004 |
| JP | 2004-181628 | A | 7/2004 |
| JP | 2004-203038 | A | 7/2004 |
| JP | 2004-245411 | A | 9/2004 |
| JP | 2004-301247 | A | 10/2004 |
| JP | 2006-002130 | A | 1/2006 |
| JP | 2007-15245 | A | 1/2007 |
| JP | 2008-265283 | A | 11/2008 |
| JP | 2011-006680 | A | 1/2011 |
| JP | 2011-011542 | A | 1/2011 |

OTHER PUBLICATIONS

Machine translation of claims of JP 8-104806 (Murakami et al.), translation date Apr. 19, 2013.*
Extended European Search Report dated Mar. 18, 2013 in European Patent Application No. 10756215.9 to Bridgestone Corp.
Database WPI, Week 200405, Thomson Scientific, London, GB; AN 2004-046320, XP-002693382.
Database WPI, Week 200382, Thomson Scientific, London, GB; AN 2003-902992, XP-002693383.
Database WPI, Week 199626, Thomson Scientific, London, GB; AN 1996-255195, XP-002693384.
Japanese Office Action issued on Nov. 12, 2013 in Japanese Application No. 2009-170210.
Office Action dated Sep. 26, 2013 from the People's Republic of China Patent Office in a counterpart Chinese Application No. 201080014135.3.

* cited by examiner

REFRIGERANT TRANSPORTING HOSE AND POLYAMIDE RESIN COMPOSITION FOR FORMING GAS BARRIER LAYER OF THE SAME

CROSS REFERENCE TO RELATED APPLICATIONS

This application is a National Stage of International Application No. PCT/JP2010/055356 filed on Mar. 26, 2010, which claims priority from Japanese Patent Application Nos. 2009-079487, filed on Mar. 27, 2009, 2009-130622, filed on May 29, 2009, 2009-133251, filed Jun. 2, 2009, 2009-170210 and filed on Jul. 21, 2009, the contents of all of which are incorporated herein by reference in their entirety.

TECHNICAL FIELD

The present invention relates to refrigerant transporting hoses, and specifically to a refrigerant transporting hose including a gas barrier layer made of a polyamide resin composition. The present invention also relates to a polyamide resin composition for forming the gas barrier layer of the refrigerant transporting hose.

BACKGROUND ART

Automotive air conditioners use chlorofluorocarbon gases, such as HFC-134a (R-134a), as refrigerants.

From the viewpoint of improving ride comfort, rubber hoses, which are superior in absorbing vibration, are used for automotive air-conditioning piping. In order to prevent the refrigerant from leaking, the rubber hose has a structure including an innermost polyamide resin layer superior in gas barrier property and in vibration durability such as impulse resistance. The hose is also provided with a rubber inner tube layer on the polyamide resin layer, a reinforcing fiber layer made of PET or any other organic fiber on the rubber inner tube layer, and further a weather-resistant EPDM rubber layer on the reinforcing fiber layer (Patent Literature 1).

A refrigerant transporting hose has been proposed whose innermost gas barrier layer is made of a polyamide resin containing a polyolefin elastomer as a flexibility-imparting agent to impart refrigerant permeation resistance and flexibility (Patent Literature 2).

However, polyamide resins can be undesirably degraded by chlorofluorocarbons used as refrigerants, or oil from a compressor. This disadvantage cannot be solved even by adding a polyolefin elastomer. Thus, the known refrigerant transporting hoses still have a remaining issue in terms of durability.

For example, if even a trace amount of acid component is present in an air conditioning system, the polyamide resin composition can be seriously degraded by the acid component under practical conditions of high temperature and high pressure, and may become unusable. Such an acid component can be an extreme pressure agent contained in a compressor oil, enclosed together with a refrigerant. Therefore, some known refrigerant transporting hoses cannot exhibit sufficient durability in practice and may become unusable, depending on environmental conditions and the type of oil used in the air conditioner.

On the other hand, for fiber-reinforced hoses used for automotive oil systems, the hoses including a fiber-reinforced layer between the inner layer made of an acrylic rubber containing an amine-based vulcanizing agent and the outer layer, a technique has been proposed in which hydrotalcite is added to the acrylic rubber to prevent the reinforcing fiber from being degraded by the heat for vulcanization in the manufacturing process (Patent Literature 3). In another technique, for gasohol fuel hoses, hydrotalcite is added to a butyl rubber composition for forming an alcohol-blocking layer around the outer periphery of the inner layer made of a polyamide resin composition to enhance the adhesion between the layers (Patent Literature 4). These techniques, however, do not suggest any solution for the issue the invention should overcome which is to prevent the polyamide resin from being degraded by the refrigerant or compressor oil.

In Patent Literature 5, it is described that by adding magnesium oxide to a polyamide resin outer layer formed on the outer periphery of a fluororesin inner layer, in a predetermined amount relative to the polyolefin elastomer of the outer layer, the adhesion between the polyamide resin outer layer and the fluororesin inner layer is improved. However, this does not imply a combined use of magnesium oxide and hydrotalcite, and the disclosure is not intended to prevent the degradation of polyamide resin.

Fluororesins have excellent chemical durability. However, fluororesins are highly permeable to gases and do not easily adhere to polyamide resins. To overcome these disadvantages, a refrigerant transporting hose has been proposed which includes an inner resin layer having a double-layer structure including an acid-modified fluororesin layer and a polyamide resin layer (Patent Literatures 6 to 9).

In such a refrigerant transporting hose, the acid-modified fluororesin layer can protect the polyamide resin layer and prevent the degradation with chlorofluorocarbons used as the refrigerant or oil from the compressor because of its superior chemical stability and high adhesion to the polyamide resin layer. In addition, the multilayer structure of the acid-modified fluororesin layer and the polyamide resin layer can provide excellent gas barrier properties.

However, the hose including the inner resin layer having the double-layer structure including an acid-modified fluororesin layer and a polyamide resin layer has a high flexural rigidity and, hence, cannot meet the flexibility requirement for routing hoses in a narrow space. Furthermore, although automotive air conditioning hoses are particularly required to exhibit high durability in a fatigue test such as a repeated pressure test (impulse test), as well as to have flexibility, the hose including the inner resin layer having the double-layer structure of an acid-modified fluororesin layer and a polyamide resin layer is also inferior in durability, such as impulse resistance.

Patent Literature 10 (Japanese Examined Patent Application Publication No. 62-13380) has proposed a method for manufacturing a polyamide resin composition containing a flame retardant containing a halogenated organic compound. In this method, the flame retardant is added to a low-melting-point polyamide to prepare a low-melting-point polyamide master batch in advance, and this low-melting-point polyamide masterbatch is mixed with a high-melting-point polyamide. In this method, a flame retardant in the form of a low-melting-point polyamide masterbatch is added to a high-melting-point polyamide in order to prevent the degradation resulting from local overheating that may be caused by a high shear force generated when a flame retardant is directly mixed with a high-melting-point polyamide. Thus, the method is not intended for mixing a specific metal compound to a polyamide resin composition containing a polyamide resin and a polyolefin elastomer.

CITATION LIST

Patent Literature

PTL 1: Japanese Unexamined Patent Application Publication No. 2007-15245
PTL 2: Japanese Unexamined Patent Application Publication No. 2000-120944
PTL 3: Japanese Unexamined Patent Application Publication No. 2001-116173
PTL 4: Japanese Unexamined Patent Application Publication No. 2008-265283
PTL 5: Japanese Unexamined Patent Application Publication No. 8-104806
PTL 6: Japanese Unexamined Patent Application Publication No. 2004-122794
PTL 7: Japanese Unexamined Patent Application Publication No. 2004-203038
PTL 8: Japanese Unexamined Patent Application Publication No. 2004-245411
PTL 9: Japanese Unexamined Patent Application Publication No. 2004-301247
PTL 10: Japanese Examined Patent Application Publication No. 62-13380

SUMMARY OF INVENTION

Technical Problem

It is a first issue of the present invention to provide a durable refrigerant transporting hose including a gas barrier layer made of a polyamide resin composition, in which the gas barrier layer is prevented from being degraded by the refrigerant or the compressor oil.

It is a second issue of the invention to provide a refrigerant transporting hose that is more durable even though the metal compound content is low.

It is a third issue of the invention to solve the problem with flexibility and impulse resistance in refrigerant transporting hoses whose inner resin layer has a multilayer structure including an acid modified fluororesin layer and a polyamide resin layer, and thus to provide a refrigerant transporting hose having excellent gas barrier property, flexibility, and durability.

Also, it is an issue of the present invention to provide a polyamide resin composition in which a metal compound is more uniformly dispersed, and which can be prevented, without reducing the impulse resistance, from being degraded by the refrigerant or the compressor oil.

In addition, it is a fourth issue of the invention to provide a durable refrigerant transporting hose including a gas barrier layer made of the polyamide resin composition.

Solution to Problem

A refrigerant transporting hose according to a first aspect includes a gas barrier layer made of a polyamide resin composition. The polyamide resin composition contains at least one metal compound selected from the group consisting of hydroxides, oxides and carbonates of divalent and trivalent metals in an amount of 1% to 15% by weight relative to the total amount of the metal compound and the polymer component.

A refrigerant transporting hose of a second aspect accords to the first aspect, and in which the metal compound is hydrotalcite, or hydrotalcite and another metal compound.

A refrigerant transporting hose of a third aspect accords to the second aspect, and in which the metal compound other than the hydrotalcite is magnesium oxide.

A refrigerant transporting hose of a fourth aspect accords to the second or third aspects, and in which the contents of (a) hydrotalcite and (b) metal compound in the polyamide resin composition are each 0.5% to 10% by weight relative to the polymer component, and the weight ratio of (a) hydrotalcite to (b) metal compound ((a) hydrotalcite: (b) metal compound) is 80:20 to 50:50.

A refrigerant transporting hose of a fifth aspect accords to any one of the first to fourth aspects, and in which the polyamide resin composition contains a polyolefin elastomer.

A refrigerant transporting hose of a sixth aspect accords to the fifth aspect, and in which at least part of the polyolefin elastomer is modified with an acid.

A refrigerant transporting hose of a seventh aspect accords to the fifth or sixth aspect, and in which the polyolefin elastomer content in the polyamide resin composition is 10% to 45% by weight relative to the total weight of the polyamide resin composition.

A refrigerant transporting hose of an eighth aspect accords to any one of the first to seventh aspects, and includes an inner resin layer having a three-layer structure including, from the inner side, an acid-modified fluororesin layer, a polyamide resin layer and a polyamide/polyolefin elastomer composite resin layer.

A refrigerant transporting hose of a ninth aspect accords to the eighth aspect, and in which the acid-modified fluororesin layer has a thickness of 100 μm or less, the polyamide resin layer has a thickness of 100 μm or less, and the polyamide/polyolefin elastomer composite resin layer has a thickness of 50 μm or more.

A refrigerant transporting hose of a tenth aspect accords to the eighth or ninth aspect, and in which the acid-modified fluororesin is a fluorine-containing copolymer including a polymerization unit based on tetrafluoroethylene, a polymerization unit based on ethylene, and a polymerization unit based on itaconic anhydride and/or citraconic anhydride.

A refrigerant transporting hose of an eleventh aspect accords to any one of the eighth to tenth aspects, and in which the polyamide/polyolefin elastomer composite resin contains a polyamide resin and a polyolefin elastomer, and the polyolefin elastomer content is 10% to 45% by weight relative to the total weight of the polyamide/polyolefin elastomer composite resin.

A refrigerant transporting hose of a twelfth aspect accords to any one of the eighth to eleventh aspects, and in which the polyamide/polyolefin elastomer composite resin layer contains at least one metal compound selected from the group consisting of hydroxides, oxides and basic salts of divalent and trivalent metals.

A refrigerant transporting hose of a 13th aspect accords to any one of the eighth to twelfth aspects, and further includes a reinforcing layer made of a reinforcing thread and a rubber sheath layer on the outer periphery of the inner resin layer.

A refrigerant transporting hose of a 14th aspect accords to any one of the first to seventh aspects, and further includes a reinforcing layer made of a reinforcing thread and a rubber sheath layer on the outer periphery of the gas barrier layer.

A polyamide resin composition for forming a gas barrier layer of a refrigerant transporting hose, according to a 15th aspect contains at least one metal compound selected from the group consisting of hydroxides, oxides and carbonates of divalent and trivalent metals in an amount of 1% to 15% by weight relative to the total amount of the metal compound and the polymer component.

A polyamide resin composition for forming a gas barrier layer of a refrigerant transporting hose, according to a 16th aspect contains (a) hydrotalcite and (b) at least one metal compound other than hydrotalcite selected from the group consisting of hydroxides, oxides and basic salts of divalent and trivalent metals, in a proportion of 1% to 15% by weight relative to the polymer component.

A method for producing a polyamide resin composition according to a 17th aspect produces a polyamide resin composition containing a polyamide resin, a polyolefin elastomer, at least one metal compound selected from the group consisting of hydroxides, oxides and carbonates of divalent and trivalent metals. The method includes the first mixing step of mixing and kneading the metal compound and the polyolefin elastomer, and the second mixing step of mixing and kneading the mixture prepared in the first mixing step and the polyamide resin.

A method for producing a polyamide resin composition of an 18th aspect accords to the 17th aspect, and in which the proportion of the metal compound in the polyamide resin composition is 5% to 20% by weight relative to the polymer component.

A method for producing a polyamide resin composition of a 19th aspect accords to the 17th or 18th aspect, and in which the metal compound is hydrotalcite.

A method for producing a polyamide resin composition of a 20th aspect accords to any one of the 17th to 19th aspects, and in which the polyolefin elastomer content in the polyamide resin composition is 10% to 45% by weight relative to the total weight of the polyamide resin composition.

A method for producing a polyamide resin composition of a 21st aspect accords to any one of the 17th to 20th aspects, and in which at least part of the polyolefin elastomer is modified with an acid.

A polyamide resin composition according to a 22nd aspect is produced by the method for producing a polyamide resin composition according to any one of the 17th to 21st aspects.

A polyamide resin composition of a 23rd aspect accords to the 22nd aspect, and the polyamide resin composition is intended to form a gas barrier layer of a refrigerant transporting hose.

A refrigerant transporting hose according to a 24th aspect includes a gas barrier layer made of the polyamide resin composition according to the 22nd aspect.

A refrigerant transporting hose of a 25th aspect accords to the 24th aspect, and further includes a reinforcing layer made of a reinforcing thread and a rubber sheath layer on the outer periphery of the gas barrier layer.

Advantageous Effects of Invention

The refrigerant transporting hose of the first aspect includes a gas barrier layer made of a polyamide resin composition. The polyamide resin composition contains at least one metal compound selected from the group consisting of hydroxides, oxides and carbonates of divalent and trivalent metals in an amount of 1% to 15% by weight relative to the total amount of the metal compound and the polymer component. By adding a specific metal compound in a predetermined proportion to the polyamide resin composition, the gas barrier layer made of the polyamide resin composition can be prevented effectively from being degraded by the refrigerant or the compressor oil, and, thus, the durability of the gas barrier layer can be enhanced.

It is not clear in detail how the specific metal compound used in the present invention prevents the polyamide resin from being degraded by the refrigerant or the compressor oil. It is however supposed that the metal compound in the polyamide resin composition acts as an acid acceptor, a halogen acceptor or the like to trap degradation factors such as acid components or halogen components contained in the refrigerant or the oil, and is thus effective in preventing the degradation of the polyamide resin.

Accordingly, the refrigerant transporting hose of the first aspect can exhibit superior durability and can be used stably and safely over the long term without being affected by the oil used or the environment in which the system is used.

In the first aspect, hydrotalcite, or hydrotalcite and another metal compound (for example, magnesium oxide), is preferably used as the metal compound (second and third aspects).

In the first aspect, in addition, about 10% to 45% by weight of polyolefin elastomer may be added to the polyamide resin composition of the gas barrier layer. Consequently, the flexibility and durability of the gas barrier layer are enhanced (fifth and seventh aspects).

The polyolefin elastomer may be modified at least in part with an acid to enhance the compatibility with the polyamide resin (sixth aspect).

Preferably, the refrigerant transporting hose of the first aspect is provided with a reinforcing layer made of a reinforcing thread and a rubber sheath layer on the outer periphery of the gas barrier layer (14th aspect).

The polyamide resin composition for forming a gas barrier layer of a refrigerant transporting hose, according to the 15th aspect contains at least one metal compound selected from the group consisting of hydroxides, oxides and carbonates of divalent and trivalent metals in an amount of 1% to 15% by weight relative to the total amount of the metal compound and the polymer component. This composition is superior in gas barrier property and durability.

In the fourth and 16th aspects, the polyamide resin composition of a gas barrier layer contains (a) hydrotalcite and (b) at least one metal compound other than hydrotalcite selected from the group consisting of hydroxides, oxides and basic salts of divalent and trivalent metals (this metal compound other than hydrotalcite hereinafter may be referred to as "metal compound (b)") in a predetermined proportion. By adding both hydrotalcite and metal compound (b) to the polyamide resin composition in a predetermined proportion, the gas barrier layer made of the polyamide resin composition can be prevented from being degraded by the refrigerant or the compressor oil more effectively than the case where either is added. Thus, the durability of the gas barrier layer can be enhanced.

The addition of metal compounds can produce a problem with the dispersibility of the metal compounds in the polyamide resin composition, as described above. If a larger amount of metal compound is added to a polyamide resin composition to prevent more effectively the degradation of the polyamide resin composition with the refrigerant or the compressor oil, the metal compound cannot disperse sufficiently. Consequently, a problem occurs that the extruded resin is poor in the surface state and cannot form a uniform film. The nonuniform portion of the film can cause fracture therefrom in a repeated fatigue test or the like. This causes the resulting hose to be degraded in durability in a repeated pressure test (impulse test).

Accordingly, from the viewpoint of enhancing the durability while maintaining hose performance such as impulse resistance, it is preferable that the amount of the metal compound added to the polyamide resin composition be reduced as much as possible within the range in which the addition of the metal compound is effective.

According to the fourth and 16th aspects, by adding at least two metal compounds including hydrotalcite and another metal compound (b) in combination, the total amount of the metal compound added is reduced relative to the case where only a metal compound is added alone, and, in addition, a higher addition effect can be produced.

Details of the mechanism of the reduction of the needed amount of the metal compound by the combined use of two metal compounds are not clear, but may be supposed as below.

Specifically, when only metal compound (b) is used, it has high ability to trap the above mentioned degradation factors such as acid components and halogen components, but may release them again due to equilibrium reactions. On the other hand, it is supposed that hydrotalcite can take the trapped components into its crystal without releasing them, but is inferior in trapping ability.

Probably, metal compound (b) and hydrotalcite make a good complement to each other, and thus can prevent degradation more effectively in a small amount.

According to the fourth and 16th aspects, therefore, the gas barrier layer can be stably and safely used with high durability over the long term, without being affected by the oil used or the environment in the system, and without degrading the impulse resistance by adding a metal compound.

From the viewpoint of producing the effect of the combined use of hydrotalcite and metal compound (b) more advantageously, it is preferable that their contents in the polyamide resin composition be each 0.5% to 10% by weight relative to the polymer component, and that the weight ratio of the hydrotalcite to metal compound (b) be 80:20 to 50:50.

The polyamide resin composition for forming the gas barrier layer of the refrigerant transporting hose, according to the 16th aspect contains (a) hydrotalcite and (b) at least one metal compound other than hydrotalcite selected from the group consisting of hydroxides, oxides and basic salts of divalent and trivalent metals, in a proportion of 1% to 15% by weight relative to the polymer component, and is superior in gas barrier property, impulse resistance and durability.

The refrigerant transporting hose of the eighth aspect includes an inner resin layer having a three-layer structure formed by further forming a polyamide/polyolefin elastomer composite resin layer on an inner resin layer having a double-layer structure including an acid modified fluororesin layer and a polyamide resin layer. This structure can reduce the flexural rigidity, enhance the impulse resistance, and provide a high gas barrier property, further enhancing flexibility and durability.

The acid-modified fluororesin layer preferably has a thickness of 100 μm or less, and the polyamide resin layer preferably has a thickness of 100 μm or less. The polyamide/polyolefin elastomer composite resin layer preferably has a thickness of 50 μm or more (ninth aspect).

Preferably, the acid-modified fluororesin of the acid-modified fluororesin layer is a fluorine-containing copolymer including a polymerization unit based on tetrafluoroethylene, a polymerization unit based on ethylene, and a polymerization unit based on itaconic anhydride and/or citraconic anhydride (tenth aspect).

The polyamide/polyolefin elastomer composite resin of the polyamide/polyolefin elastomer composite resin layer contains a polyamide resin and a polyolefin elastomer, and the polyolefin elastomer content is 10% to 45% by weight relative to the total weight of the polyamide/polyolefin elastomer composite resin (eleventh aspect).

Preferably, the polyamide resin layer and/or the polyamide/polyolefin elastomer composite resin layer contain at least one metal compound selected from the group consisting of hydroxides, oxides and basic salts of divalent and trivalent metals. By adding such a specific metal compound, the polyamide resin layer and the polyamide/polyolefin elastomer composite resin layer can be prevented from being degraded by the refrigerant or the compressor oil effectively, so that the durability of these resin layers is further enhanced. Thus, the layers can exhibit superior durability and can be used stably and safely over the long term without being affected by the oil used and the environment in the system (twelfth aspect).

It is not clear in detail how such a specific metal compound prevents the polyamide resin layer or the polyamide/polyolefin elastomer composite resin layer from being degraded by the refrigerant or the compressor oil. However, probably, the metal compound functions as an acid acceptor, a halogen acceptor or the like to trap degradation factors such as acid components or halogen components of the refrigerant or the oil that has permeated the polyamide resin layer through the acid-modified fluororesin layer and further permeated the polyamide/polyolefin elastomer composite resin layer. It can be supposed that the metal compound thus prevents the degradation of these layers.

Preferably, the refrigerant transporting hose is provided with a reinforcing layer made of a reinforcing thread and a rubber sheath layer particularly on the outer periphery of such an inner resin layer (13th aspect).

According to the method for producing a polyamide resin composition of the 17th aspect, when a polyamide resin composition containing a polyamide resin, a polyolefin elastomer and a specific metal compound is produced, the dispersibility of the metal compound can be enhanced while the content of the metal compound for enhancing the durability is increased, and further the impulse resistance can be ensured, by mixing and kneading the polyolefin elastomer and the metal compound in advance, and then mixing the polyamide resin to the resulting mixture.

The main cause of the degradation of the polyamide resin composition with the refrigerant or the compressor oil is an acidic component in the refrigerant or compressor oil. Therefore, it is probably effective that the metal compound is mixed to the polyamide resin so as to disperse selectively in the polyamide resin phase.

However, the dispersibility of metal compounds in polyamide resins is low. For example, if a large amount of metal compound is mixed to a polyamide resin, a nonuniform portion whose surface state is poor is formed, and this nonuniform portion causes fracture therefrom and thus can be a cause of degradation in impulse resistance.

On the other hand, polyolefin elastomers allow uniform dispersion of metal compounds. By mixing a metal compound to a polyolefin elastomer in advance, the metal compound can be uniformly dispersed in the resulting resin composition, and, consequently, can prevent the production of such a defective portion as can produce a poor surface from which fracture can occur.

The degradation of the polyamide resin composition of the refrigerant transporting hose is mainly caused by acid components, as described above. The acid components that degrade the polyamide resin composition permeate not only the polyamide resin phase, but also the polyolefin elastomer phase. Some of the acid components permeate the polyolefin elastomer phase and then reach the polyamide resin phase. The metal compound dispersed in the polyolefin elastomer phase traps the acid components passing through the polyolefin elastomer phase, thereby preventing the degradation of the polyamide resin effectively.

In the polyamide resin composition obtained in the 17th aspect, the metal compound is present dispersed mainly in the polyolefin elastomer phase. Since the metal compound thus traps acid components passing through the polyolefin elastomer phase to prevent the degradation of the polyamide resin, the metal compound can produce the advantageous effect of sufficiently preventing degradation.

However, from the viewpoint of producing this effect advantageously in the 17th aspect, a relatively large amount of metal compound is preferably added. Accordingly, the proportion of the metal compound in the polyamide resin composition is preferably 5% to 20% by weight relative to the polymer component (18th aspect).

Since the metal compound is mixed to the polyolefin elastomer in which the metal compound can be sufficiently dispersed, the problem of dispersion failure of the metal compound does not occur even though such a large amount of metal compound is added.

Preferably, the polyolefin elastomer content in the polyamide resin composition is 10% to 45% by weight, from the viewpoint of flexibility and durability (20th aspect).

The polyolefin elastomer may be modified at least in part with an acid to enhance the compatibility with the polyamide resins (21st aspect).

The polyamide resin composition of the 22nd aspect is produced by the method for producing a polyamide resin composition according to the 17th aspect, and can be suitably used for forming a gas barrier layer of a refrigerant transporting hose because of its superior gas barrier property and durability (23rd aspect).

The refrigerant transporting hose of the 24th aspect includes a gas barrier layer made of the polyamide resin composition of the 23rd aspect. The gas barrier layer is hardly degraded by the refrigerant or compressor oil, and the refrigerant transporting hose is thus superior in durability.

Preferably, the refrigerant transporting hose is provided with a reinforcing layer made of a reinforcing thread and a rubber sheath layer particularly on the outer periphery of the gas barrier layer (25th aspect).

DESCRIPTION OF EMBODIMENTS

Figure 1:
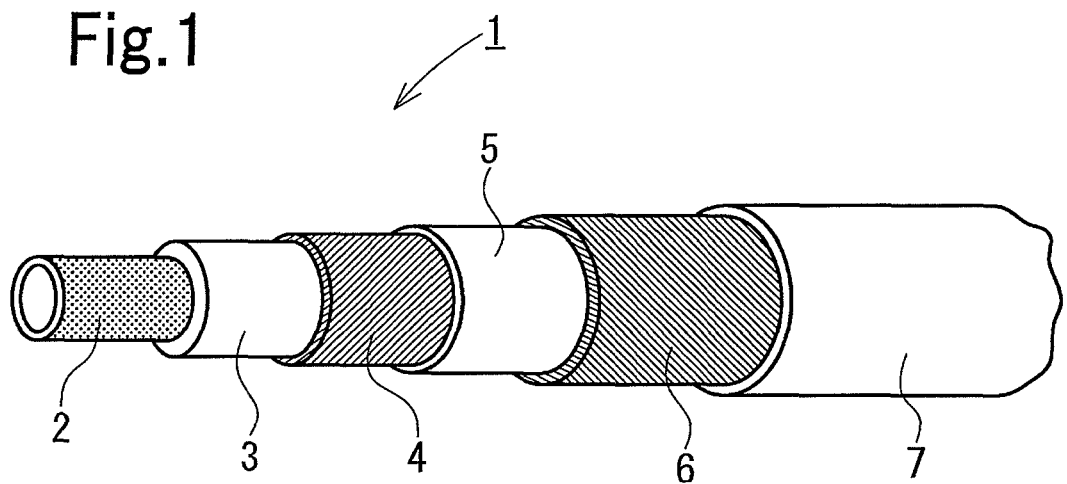
FIG. 1 is a perspective view showing a refrigerant transporting hose according to an embodiment of the present invention.

Embodiments of the present invention will now be described in detail.

First Embodiment

The first embodiment relates to the above-described first to 15th aspects. The first aspect is as below.

A refrigerant transporting hose including a gas barrier layer made of a polyamide resin composition, wherein the polyamide resin composition contains at least one metal compound selected from the group consisting of hydroxides, oxides and carbonates of divalent and trivalent metals in an amount of 1% to 15% by weight relative to the total amount of the metal compound and the polymer component.

[Polyamide Resin Composition for Forming Gas Barrier Layer of Refrigerant Transporting Hose]

The polyamide resin composition forming the gas barrier layer of a refrigerant transporting hose of the first embodiment will now be described.

The polyamide resin composition contains at least one metal compound selected from the group consisting of hydroxides, oxides and carbonates of divalent and trivalent metals in an amount of 1% to 15% by weight relative to the total amount of the metal compound and the polymer component.

The polymer component in the polyamide resin composition refers to all the polymer components including the polyamide resin (or the polyamide resin and the below-described polyolefin elastomer) and other resins.

<Polyamide Resin>

The polyamide resin used in the first embodiment mainly contains an amino acid, a lactam or a diamine, and a dicarboxylic acid. Examples of these constituents include lactams, such as ε-caprolactam, enantlactam, and ω-laurolactam; amino acids, such as ε-aminocaproic acid, 11-aminoundecanic acid, and 12-aminododecanic acid; diamines, such as tetramethylenediamine, hexamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bis-aminomethylcyclohexane, 1,4-bis-aminomethylcyclohexane, bis-p-aminocyclohexylmethane, bis-p-aminocyclohexylpropane, and isophoronediamine; and dicarboxylic acids, such as adipic acid, suberic acid, azelaic acid, sebacic acid, dodecanedioic acid, 1,4-cyclohexanedicarboxylic acid, 1,3-cyclohexanedicarboxylic acid, terephthalic acid, isophthalic acid, naphthalene dicarboxylic acid, and dimer acids. These constituents are subjected to polymerization singly or in the form of a mixture of at least two components, and the resulting polyamide resin may be a homopolymer or a copolymer.

Polyamide resins that can be suitably used in the first embodiment include polycaproamide (nylon 6), polyhexamethylene adipamide (nylon 66), polytetramethylene adipamide (nylon 46), polyhexamethylene sebacamide (nylon 610), polyundecaneamide (nylon 11), polydodecaneamide (nylon 12), polyhexamethylene adipamide/hexamethyleneterephthalamide copolymer (nylon 66/6T), and polycaproamide/polyhexamethylene adipamide copolymer (nylon 6/66). These polyamide resins may be used singly or in combination.

The degree of polymerization of the polyamide is not particularly limited. Any of the polyamides having a relative viscosity at 25° C. in 1% by weight sulfuric acid solution (hereinafter simply referred to as "relative viscosity") in the range of 1.5 to 5.0 can be used. The concentration of the terminal group of the polyamide resin may be adjusted by adding at least one compound whose terminal group is a monocarboxylic acid and/or a dicarboxylic acid or monoamine and/or diamine to a polyamide in a desired stage.

<Metal Compound>

The metal compound contained in the polyamide resin composition of the first embodiment is selected from the group consisting of hydroxides, oxides and carbonates of divalent and trivalent metals.

Exemplary divalent and trivalent metals include magnesium, iron, zinc, calcium, nickel, cobalt, copper and other divalent metals, and aluminum, iron, manganese and other trivalent metals.

Examples of the hydroxides, oxides and carbonates of these metals include hydrotalcite, magnesium oxide, magnesium hydroxide, aluminum hydroxide, calcium oxide, and calcium carbonate. Among these, hydrotalcite is preferred because it is expected to have a superior function of accepting acids.

These metal compounds may be used singly or in a combination of at least two desired compounds in desired proportions.

Hydrotalcite is a naturally occurring clay mineral, and is expressed by the following general formula (I):

$$M^1{}_{8-x}M^2{}_x(OH)_{16}CO_2 \cdot nH_2O \qquad (I)$$

In formula (I), $M^1$ represents $Mg^{2+}$, $Fe^{2+}$, $Zn^{2+}$, $Ca^{2+}$, $Li^{2+}$, $Ni^{2+}$, $Co^{2+}$, $Cu^{2+}$ and so on, $M^2$ represents $Al^{3+}$, $Fe^{3+}$, $Mn^{3+}$ and so on, and $5 \leq x \leq 2$ almost holds true, and $n \geq 0$ holds true.

Examples of hydrotalcite, in a form containing crystal water, include $Mg_{4.5}Al_2(OH)_{13}CO_3 \cdot 3.5H_2O$, $Mg_{4.5}Al_2(OH)_{13}\ CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot wH_2O$, and $Mg_3ZnAl_2(OH)_{12}CO_3$. Commercially available water-containing hydrotalcites include "DHT-4A" and "DHT-6", each produced by Kyowa Chemical Industry.

As for the metal compound content in the polyamide resin composition, if it is too low, the effect of the metal compound to prevent degradation cannot be sufficiently produced even though it is added. If it is too high, the effect is not as high as the effect expected from the amount of the metal compound added, and properties such as gas barrier property, flexibility, and aging resistance are disadvantageously degraded. Accordingly, the metal compound content in the polyamide resin composition is set to 1% to 15% by weight, preferably 1% to 5% by weight, relative to the total amount of the metal compound and the polymer component of the polyamide resin composition.

<Polyolefin Elastomer>

The polyamide resin composition used in the first embodiment may contain a polyolefin elastomer. By adding a polyolefin elastomer, flexibility and durability can be imparted to the gas barrier layer made of the polyamide resin composition.

Examples of the olefin elastomer include ethylene-butene copolymer, EPR (ethylene-propylene copolymer), modified ethylene-butene copolymer, EEA (ethylene-ethyl acrylate copolymer), modified EEA, modified EPR, modified EPDM (ethylene-propylene-diene ternary copolymer), ionomer, α-olefin copolymer, modified IR (isoprene rubber), modified SEBS (styrene-ethylene-butylene-styrene copolymer), halogenated isobutylene-p-methyl styrene copolymer, ethylene-acrylic acid-modified form, ethylene-vinyl acetate copolymer and its acid-modified form, and mixtures mainly containing these elastomers. These may be used singly or in combination.

Among such polyolefin elastomers, acid anhydrides such as maleic anhydride, alkyl acrylates such as glycidyl methacrylate, and epoxy and its modified form are preferred. These can form a fine alloy structure including a polyamide resin as the base polymer, and are thus preferred.

As for the polyolefin elastomer content in the polyamide resin composition used in the first embodiment, if it is too low, the flexibility or the durability cannot be sufficiently improved even though it is added. If it is too high, the gas barrier property is degraded. Accordingly, the polyolefin elastomer content in the polyamide resin composition is preferably 10% to 45% by weight, and particularly 20% to 40% by weight. If the polyolefin elastomer content in the polyamide resin composition is too high, the sea phases and the island phases are reversed in the sea-island structure described below. This undesirably reduces the gas barrier property significantly.

If a modified elastomer such as an acid-modified elastomer is used as the polyolefin elastomer, mixing (dispersion) can be performed at a low specific energy without requiring an advanced high mixing technique. However, if its content is high, the resin is gelated, and thus a poor appearance (fisheye) such as rough surface is produced when it is extracted. Accordingly, when a modified elastomer is used as the polyolefin elastomer, the modified elastomer content in the polyamide resin composition is preferably 20% by weight or less, such as 5% to 20% by weight.

In the present invention, particularly, it is preferable that an acid-modified elastomer accounts for 40% to 100% by weight of the polyolefin elastomer in the polyamide resin composition.

In order to make the polyamide resin composition and the polyolefin elastomer compatible, that is, sufficiently dispersed, it is preferable that at least part of the elastomer be modified with, for example, maleic anhydride. The elastomer used to prepare a good dispersion preferably has an average acid value (acid modification ratio) of 0.8 mg-$CH_3ONa/g$ or more as a whole.

The higher the acid value of the elastomer, the better the dispersion state. However, as the acid value increases, the viscosity of the polyamide resin composition is increased and the formability of the polyamide resin composition is degraded. From the viewpoint of alleviating the increase in viscosity resulting from the increase in acid value, the acid value of the elastomer is preferably as low as possible within the range in which a good dispersion state can be established, and the average acid value of the elastomer, as a whole, is preferably 7.5 mg-$CH_3ONa/g$ or less.

In the case where the average acid value is constant, if the acid value of the modified elastomer in the entire elastomer used is high, foreign matter in a gel state, which is probably caused by a local hyperreaction during extrusion, is undesirably produced by mixing the modified elastomer and the unmodified elastomer, even if the average acid value is reduced. Accordingly, the acid value of the modified elastomer to be used is preferably 15.0 mg-$CH_3ONa/g$ or less.

Although flexibility and durability are improved by adding a polyolefin elastomer to the polyamide resin composition, the degradation of the gas barrier property is inevitable. However, by forming an alloy structure of the polyamide resin and a polyolefin elastomer, particularly by forming a structure in which elastomer island phases are dispersed in a polyamide sea phase while the polyamide resin is dispersed in a dotted manner in the elastomer island phases, the degradation of the gas barrier property caused by adding an elastomer can be advantageously suppressed.

In particular, the ratio of the polyamide resin dotted in the elastomer island phases to the polyamide resin (total of the polyamide resin forming the sea phase and the polyamide resin dotted in the elastomer island phases) (this ratio hereinafter referred to as "dotted dispersion ratio") is preferably about 5% to 40% by weight. If this ratio is less than 5% by weight, the effect expected by dotting the polyamide resin in the elastomer island phases cannot be satisfactorily produced. In contrast, if it is more than 40% by weight, the sea phase of the polyamide resin is excessively reduced in amount, and accordingly the gas barrier property can be undesirably degraded.

The sizes of the elastomer island and the polyamide resin phase in the elastomer island phase are preferably about 0.1 to 3.0 μm and about 0.5 to 2.0 μm, respectively.

<Other Constituents>

The polyamide resin composition used in the first embodiment may contain other resin components in addition to the polyamide resin. In this instance, however, it is preferable that the polyamide resin accounts for 70% by weight or more in all the polymer components in the refrigerant transporting hose, from the viewpoint of ensuring a gas barrier property.

Such other resin components include ethylene-vinyl alcohol resin.

Also, the polyamide resin composition of the first embodiment may contain other additives, such as a lubricant, an anti-static agent, an antiaging agent, an antioxidant, a coloring agent, a crystal nucleating agent, a filler, a reinforcing agent, a heat resisting agent, and a light-resisting agent.

[Refrigerant Transporting Hose]

A refrigerant transporting hose of the present invention in which the above-described polyamide resin composition for forming a gas barrier layer of a refrigerant transporting hose is used as the material of the gas barrier layer thereof will now be described with reference to the drawings.

FIG. 1 is a perspective view illustrating the structure of the layers of a refrigerant transporting hose 1 according to an embodiment. The innermost layer of the refrigerant transporting hose 1 is defined by a gas barrier layer 2 made of the polyamide resin composition. An inner rubber layer 3 is disposed on the outer periphery of the gas barrier layer 2, and then a first reinforcing fiber layer 4, an intermediate rubber layer 5, a second reinforcing fiber layer 6, and a rubber sheath layer 7 are formed in that order. The inner diameter of the hose 1 is generally 6 to 20 mm, and particularly about 8 to 19 mm.

The material or the like of each layer will be described below.

<Gas Barrier Layer>

The gas barrier layer 2 is made of the polyamide resin composition for forming a gas barrier layer of a refrigerant transporting hose of the present invention, containing the above-described metal compound in a proportion of 1% to 15% by weigh relative to the total amount of the metal compound and the polymer component.

The gas barrier layer 1 made of such a polyamide resin composition is preferably thicker in view of the gas barrier property. However, as the thickness increases, the flexibility of the hose is reduced.

Accordingly, the thickness of the gas barrier layer 2 is preferably 50 to 400 µm, and particularly 100 to 300 µm.

The refrigerant transporting hose of the first embodiment may further include an inner rubber layer as the innermost layer on the inner side of the gas barrier layer 2 in the structure of the refrigerant transforming hose 10 shown in FIG. 1.

Other components of the refrigerant transporting hose of the first embodiment are not particularly limited, and a typical structure of refrigerant transporting hoses may be adopted as described below.

<Inner Rubber Layer 3, Rubber Sheath Layer 7, and Intermediate Rubber Layer 5>

Rubbers used for the inner rubber layer 3 and the rubber sheath layer 7 include, generally, butyl rubber (IIR), chlorinated butyl rubber (Cl-IIR), chloropolyethylene, chlorosulfonylpolyethylene, brominated butyl rubber (Br-IIR), isobutylene-bromo-p-methylstyrene copolymer, EPR (ethylene-propylene copolymer), EPDM (ethylene-propylene-diene ternary copolymer), NBR (acrylonitrile butadiene rubber), CR (chloroprene rubber), hydrogenated NBR, acrylic rubber, ethylene-acrylic rubber (AEM), mixtures containing at least two of these rubbers, and mixtures containing any of these rubbers as the main constituent and a polymer. Preferably, butyl rubber or EPDM rubber is used. Additives, such as filler, a processing aid, an antiaging agent, a vulcanizing agent, and a vulcanization accelerator may be added to these rubbers.

The rubbers of the inner rubber layer 3 and the outer sheath layer 7 may be the same or different.

The intermediate rubber layer 5 may be made of a rubber having a good adhesion to the inner rubber layer 2 and the sheath layer 7 without being otherwise limited.

The thickness of the inner rubber layer 3 is preferably about 0.5 to 4 mm in view of the flexibility. Preferably, the thickness of the intermediate rubber layer 5 is about 0.1 to 0.6 mm, and the thickness of the sheath layer 7 is about 0.5 to 2 mm.

<Reinforcing Fiber Layers 4 and 6>

The first reinforcing fiber layer 4 is formed by winding a reinforcing thread in a spiral manner, and the second reinforcing fiber layer 6 is formed by winding a reinforcing thread in a spiral manner in the opposite direction to the first reinforcing fiber layer 4.

Generally used materials can be used for the reinforcing thread without particular limitation. In general, polyester, fully aromatic polyester, nylon, vinylon, rayon, aramid, polyacrylate, and polyethylene naphthalate can be used, and strands of these materials may be used.

<Method for Manufacturing Refrigerant Transporting Hose>

The refrigerant transporting hose of the first embodiment can be manufactured according to an ordinary process, by extruding the materials of the gas barrier layer 2 and the inner rubber layer 3 to predetermined thicknesses on a mandrel to form a layered structure, winding the reinforcing fiber layer 4 around the layered structure, forming the intermediate rubber layer 5 by extrusion, winding the reinforcing fiber layer 6 around the underlying layer, and then forming the rubber sheath layer 7 by extrusion. The resulting structure is vulcanized at 140 to 170° C. for 30 to 120 minutes.

Examples and Comparative Examples of the First Embodiment

Examples and Comparative Examples using polyamide resin samples will now be described below.

Materials were mixed and kneaded according to the compositions shown in Tables 1 and 2 to prepare polyamide resin test samples. For mixing, the materials were mixed and kneaded at 230° C., a temperature higher than or equal to the melting point of the polyamide resin, using a twin screw kneader manufactured by Toyo Seiki.

The materials used in the preparation of polyamide resin test samples were as follows:

Polyamide 6: Nylon 6 "1022B" produced by Ube Industries

Elastomer: α-olefin polymer (ethylene-butene copolymer) "TAFMER A-1050S" produced by Mitsui Chemicals Maleic acid-modified elastomer: α-olefin polymer (ethylene-butene copolymer) "TAFMER MH-7010" produced by Mitsui Chemicals Hydrotalcite A: "Hydrotalcite DHT-4A" produced by Kyowa Chemical Composition formula: $Mg_{4.5}Al_2(OH)_{13}CO_3 \cdot 3.5H_2O$ Magnesium oxide: "Kyowamagu 30" produced by Kyowa Chemical Composition formula: MgO The resulting polyamide resin test samples were subjected to evaluation for properties in the following methods, and the results are shown in Tables 1 and 2.

<Dispersibility of Elastomer>

The polyamide resin test samples surface-treated with phosphotungstic acid were observed to examine particle size of the dispersed elastomer through an electron microscopy (SEM). When the particle size of dispersed particles was 3 μm or less, the dispersibility was determined to be OK, and when it was 3 μm or more, the dispersibility was determined to be NG.

<Index of Elastic Modulus in 4% Elongation>

The elastic modulus of each polyamide resin test sample in a state where it was elongated at a tension rate of 50 mm/min was measured using a tensile tester manufactured by Toyo Seiki. The results were represented as indices to the polyamide resin test sample of Comparative Example 1 (100).

<Gas Permeability Index>

The permeability to He gas of each polyamide resin test sample was measured at 100° C., at an absolute differential pressure of 226 cmHg, using a gas permeability tester manufactured by GTR Tech. The results are represented as indices to the polyamide resin test sample of Comparative Example 1 (100).

<Retention Factor of Strength after Aging>

Each polyamide resin test sample after aging test described below was measured for breaking strength in a state where it was elongated at a tension rate of 50 mm/min, using a tensile tester manufactured by Toyo Seiki. The values after the aging test are represented as percentage to the value before the aging test.

<Retention Factor of Breaking Elongation after Aging>

Each polyamide resin test sample after aging test described below was measured for breaking elongation in a state where it was elongated at a tension rate of 50 mm/min, using a tensile tester manufactured by Toyo Seiki. The values after the aging test are represented by percentage to the value before the aging test.

(Aging Test)

A procedure was performed through the following steps 1 to 7.

1. Charge a pressure-resistant vessel with 1 cc of water.
2. Place a polyamide resin test sample of 10 in width by 50 mm in length by 0.1 mm in thickness in the vessel.
3. Place 100 cc of polyalkylene glycol oil in the vessel.
4. After freezing the pressure-resistant vessel for 15 minutes, evacuate the pressure-resistant vessel for 5 minutes.
5. Place 100 cc of refrigerant R-134a in the vessel.
6. Allow the vessel to stand at 150° C. in a high-temperature bath for 4 weeks.
7. Take the polyamide resin test sample from the vessel and perform measurements for evaluation.

<Surface Roughness>

Using a "surface roughness tester Surf Coder SE-2300" manufactured by Kosaka Laboratory, the center line average surface roughness was measured in accordance with JIS B0601

TABLE 1

|  |  | Example I-1 | Example I-2 | Example I-3 | Example I-4 | Example I-5 | Example I-6 | Example I-7 |
|---|---|---|---|---|---|---|---|---|
| Polyamide resin composition (wt %) | Polyamide 6 | 99.0 | 95.0 | 90.0 | 85.0 | 75.0 | 65.0 | 95.0 |
|  | Elastomer | — | — | — | — | 10.0 | 15.0 | — |
|  | Maleic acid-modified elastomer | — | — | — | — | 10.0 | 15.0 | — |
|  | Hydrotalcite | 1.0 | 5.0 | 10.0 | 15.0 | 5.0 | 5.0 | — |
|  | Magnesium oxide | — | — | — | — | — | — | 5.0 |
| Evaluation results | Index of elastic modulus in 4% elongation (relative to Comparative Example 1) | 100 | 100 | 100 | 100 | 80 | 60 | 100 |
|  | Gas permeability index (relative to Comparative Example 1) | 100 | 100 | 100 | 100 | 140 | 180 | 100 |
|  | Retention factor (%) of strength after aging | 75 | 90 | 97 | 100 | 100 | 100 | 85 |
|  | Retention factor (%) of breaking elongation after aging | 75 | 85 | 95 | 100 | 98 | 95 | 83 |
|  | Elastomer dispersibility | — | — | — | — | OK | OK | — |
|  | Surface roughness Ra (μm) | 0.12 | 0.41 | 0.65 | 0.84 | 0.34 | 0.33 | 0.39 |

TABLE 2

|  |  | Comparative Example I-1 | Comparative Example I-2 | Comparative Example I-3 |
|---|---|---|---|---|
| Polyamide resin composition (wt %) | Polyamide 6 | 100.0 | 99.5 | 80.0 |
|  | Elastomer | — | — | — |
|  | Maleic acid-modified elastomer | — | — | — |
|  | Hydrotalcite | — | 0.5 | 20.0 |
| Evaluation results | Index of elastic modulus in 4% elongation (relative to Comparative Example 1) | 100 | 100 | 80 |
|  | Gas permeability index (relative to Comparative Example 1) | 100 | 100 | 80 |
|  | Retention factor (%) of strength after aging | Unmeasurable | Unmeasurable | 85 |
|  | Retention factor (%) of breaking elongation after aging | 0 | 0 | 60 |
|  | Elastomer dispersibility | — | — | — |
|  | Surface roughness Ra (μm) | 0.008 | 0.095 | 1.1 |

It is found from Tables 1 and 2 that the refrigerant transporting hoses of the present invention, whose gas barrier layer-forming polyamide resin composition contains a predetermined amount of metal compound, are superior in gas barrier property, flexibility, and durability. As shown in Table 1, Examples I-1 and I-5 exhibited lower surface roughnesses Ra than Examples I-3 and I-4.

Second Embodiment

A second embodiment relates to the above-described 16th and fourth aspects.

A polyamide resin composition according to a second embodiment is intended to form a gas barrier layer of a refrigerant transporting hose, and contains (a) hydrotalcite and (b) at least one metal compound other than hydrotalcite selected from the group consisting of hydroxides, oxides and basic salts of divalent and trivalent metals, in a proportion of 1% to 15% by weight relative to the polymer component.

The polymer component in the polyamide resin composition refers to all the polymer components including the polyamide resin (or the polyamide resin and the below-described polyolefin elastomer) and other resins.

The description of the polyamide resin in the polyamide resin composition of the second embodiment is the same as in the first embodiment, and the description in the first embodiment is incorporated.

<Metal Compound>

The polyamide resin composition of the second embodiment contains (a) hydrotalcite and (b) a metal compound other than hydrotalcite selected from the group consisting of hydroxides oxides and basic salts such as carbonates of divalent and trivalent metals.

Exemplary divalent and trivalent metals include magnesium, iron, zinc, calcium, nickel, cobalt, copper and other divalent metals, and aluminum, iron, manganese and other trivalent metals.

Examples of the hydroxides, oxides and basic salts such as carbonates of these metals, other than hydrotalcite, include magnesium oxide, magnesium hydroxide, aluminum hydroxide, calcium oxide, and calcium carbonate. Among these, magnesium oxide is preferred because it is expected to have a superior function of accepting acids.

These metal compounds (b) may be used singly or in a combination of at least two desired compounds in desired proportions.

The description of hydrotalcite is the same as in the first embodiment, and the description in the first embodiment is incorporated.

As for the contents of hydrotalcite and metal compound (b) in the polyamide resin composition, if they are too low, the effect of these compounds to prevent degradation cannot be sufficiently produced. If they are too high, the effect is not as high as that expected from the amounts of the compounds added, and properties such as gas barrier property, flexibility, and aging resistance are disadvantageously degraded. In particular, the dispersion failure of the metal compound degrades the surface of extruded films and reduces the impulse resistance.

Accordingly, the total content of hydrotalcite and metal compound (b) in the polyamide resin composition is preferably 1% to 15% by weight, particularly 1% to 10% by weight, relative to the polymer component in the polyamide resin composition.

In addition, in order to produce the effect of the combined used of hydrotalcite and metal compound (b) effectively, each content of hydrotalcite and metal compound (b) is preferably 0.5% to 10% by weight, particularly 0.5% to 5% by weight, relative to the polymer component of the polyamide resin composition, and the weight ratio of the hydrotalcite content to the metal compound (b) content (hydrotalcite: metal compound (b)) is preferably 80:20 to 50:50 in the polyamide resin composition.

The description of the polyolefin elastomer is the same as in the first embodiment, and the description in the first embodiment is incorporated.

<Other Constituents>

The polyamide resin composition of the second embodiment may contain other resin components in addition to the polyamide resin. Their description is the same as in the first embodiment, and the description in the first embodiment is incorporated.

<Method for Producing Polyamide Resin Composition>

Techniques for mixing and kneading the constituents of the polyamide resin composition of the second embodiment, particularly of the polyamide resin composition containing a polyolefin elastomer, include the following (i) to (iv), and the polyamide resin composition of the second embodiment may be produced by any of these techniques.

(i) A polyamide resin, a polyolefin elastomer and metal compounds (hydrotalcite and metal compound (b)) are mixed together and kneaded at one time.

(ii) A polyamide resin and a polyolefin elastomer are mixed and kneaded to prepare a polymer alloy, and then metal compounds (hydrotalcite and metal compound (b)) are added and kneaded together.

(iii) Metal compounds (hydrotalcite and metal compound (b)) are mixed to a polyamide resin in advance, and then a polyolefin elastomer is added and kneaded together.

(iv) Metal compounds (hydrotalcite and metal compound (b)) are mixed to a polyolefin elastomer in advance, and then a polyamide resin is added and kneaded together.

Among these techniques, mixing technique (iii) can produce the following effect.

In a resin composition containing a polyamide resin and a polyolefin elastomer, preferably, the polyamide resin and the polyolefin elastomer form a fine alloy structure, and island phases of the polyolefin elastomer are dispersed in a sea phase of the polyamide resin, as described above. The degradation of such a polyolefin elastomer-containing polyamide resin composition with the refrigerant or the compressor oil is mainly caused by degradation of the acid component of the polyamide resin in the composition.

In the polyamide resin composition prepared by mixing the metal compound with a polyamide resin in advance, and subsequently mixing a polyolefin elastomer together, the metal compounds are mainly present in the polyamide resin phase, and the effect of the metal compound to prevent the degradation of the polyamide resin, that is, the effect of the metal compound to trap degradation factors such as acid components and halogen components in the refrigerant and oil, can directly function effectively in the polyamide resin phase. Thus, whereas the amount of the metal compound added is reduced, a satisfactory addition effect can be produced.

Also, by using mixing technique (iv), the dispersibility of the metal compounds in the polyamide resin composition is increased to increase the amount of metal compounds for enhancing durability, and impulse resistance can be ensured.

The main cause of the degradation of the polyamide resin composition with the refrigerant or the compressor oil is acidic components in the refrigerant and compressor oil, as described above. Therefore, it is probably effective that the metal compound is mixed and kneaded with the polyamide resin so as to disperse selectively in the polyamide resin.

However, metal compounds cannot sufficiently disperse in the polyamide resin, as described above. For example, if a large amount of metal compound is added to the polyamide resin and kneaded together, a nonuniform portion whose surface state is poor is formed, and this nonuniform portion causes fracture therefrom and thus can be a cause of the degradation in impulse resistance.

On the other hand, polyolefin elastomers allow uniform dispersion of metal compounds. By mixing metal compounds to a polyolefin elastomer in advance, the metal compounds can be uniformly dispersed in the resulting resin composition, and, consequently, can prevent the production of such a defective portion as can produce a poor surface from which fracture can occur.

The degradation of the polyamide resin composition of the refrigerant transporting hose is mainly caused by acid components. The acid components that degrade the polyamide resin composition permeate not only the polyamide resin phase, but also the polyolefin elastomer phase. Some of the acid components permeates the polyolefin elastomer phase and then reach the polyamide resin phase. The metal compound dispersed in the polyolefin elastomer phase traps the acid components passing through the polyolefin elastomer phase, thereby preventing the degradation of the polyamide resin effectively.

In the polyamide resin composition obtained by method (iv), the metal compound is present in a dispersed state mainly in the polyolefin elastomer phase. Since the metal compound thus traps acid components passing through the polyolefin elastomer phase to prevent the degradation of the polyamide resin, the metal compound can produce the advantageous effect of sufficiently preventing degradation.

However, from the viewpoint of producing the above-described effect advantageously, the metal compound content is preferably as large as possible within the above range.

[Refrigerant Transporting Hose]

The refrigerant transporting hose including a gas barrier layer made of the polyamide resin composition for forming a gas barrier layer of a refrigerant transporting hose described above has the structure shown in FIG. 1. The description of this structure is the same as in the first embodiment, and the description in the first embodiment is incorporated.

Examples and Comparative Examples of the Second Embodiment

The second embodiment will now be further described with reference to examples and comparative examples.

Examples II-1 to II-10, Comparative Example II-1

Materials were mixed and kneaded according to the compositions shown in Table 4 to prepare a polyamide resin composition.

For mixing, the materials were mixed and kneaded at a temperature of 230° C., higher than or equal to the melting point (220° C.) of the polyamide resin, using a twin screw kneader manufactured by Toyo Seiki.

The materials used in the preparation of polyamide resin compositions were as follows:

Polyamide resin: Nylon 6 "1022B" produced by Ube Industries

Elastomer: α-olefin polymer (ethylene-butene copolymer) "TAFMER A-1050S" produced by Mitsui Chemicals Maleic acid-modified elastomer: α-olefin polymer (ethylene-butene copolymer) "TAFMER MH-7010" produced by Mitsui Chemicals Hydrotalcite: "Hydrotalcite DHT-4A" produced by Kyowa Chemical Composition formula: $Mg_{4.5}Al_2(OH)_{13}CO_3 \cdot 3.5H_2O$ Magnesium oxide: "Kyowamagu 30" produced by Kyowa Chemical Composition formula: $MgO$ Zinc oxide: Type 1 zinc oxide produced by Sakai Chemical Industry Calcium carbonate: Silver-W produced by Shiraishi Industrial.

Epoxy compound: Marproof G-01100 produced by NOF Corporation

The resulting test samples made of polyamide resin compositions were subjected to evaluation according to the following method, and the results are shown in Tables 6 and 7.

The methods for measuring the retention factors of the strength after aging and the breaking elongation after aging, and the surface roughness were the same as in the first embodiment.

Refrigerant transporting hoses shown in FIG. 1 were produced by the following method using the polyamide resin compositions.

The polyamide resin composition was extruded onto a mandrel having a diameter of 11 mm to form a 200 μm thick gas barrier layer 2, and then an inner rubber layer 3 was formed by extruding an inner rubber to a thickness of 1.60 mm. Twenty two polyester reinforcing threads of 1100 dtex/4 and 10 twists/10 cm were wound together around the underlying layer in a spiral manner. An intermediate rubber layer 5 was extruded to a thickness of 0.30 mm onto the resulting first reinforcing fiber layer 4, and a second reinforcing layer 6 was further formed by winging 22 polyester reinforcing threads of 1100 dtex/4 and 10 twists/10 cm together around the intermediate rubber layer 5 in a spiral manner in the opposite direction to the above. Then, a sheath rubber was extruded to a thickness of 1.2 mm to form a rubber sheath layer 7 on the second reinforcing fiber layer, and was vulcanized at 150° C. for 45 minutes. Thus, a refrigerant transporting hose was completed, having an inner diameter of 11 mm and an outer diameter of 19 mm.

The proportions of rubbers used for the inner rubber layer, the intermediate rubber layer and the rubber sheath layer were shown in the following Tables 3 to 5.

TABLE 3

| Inner Rubber | | |
| --- | --- | --- |
| Constituent | Parts by weight | Manufacturer and product name |
| IIR | 100 | Japan Butyl Co., Ltd., "Butyl 268" |
| FEF carbon | 65 | Asahi Carbon Co., Ltd., "#60" |
| Stearic acid | 1 | ADEKA Corporation, "Adeka Fatty Acid" |
| Aromatic oil | 5 | Idemitsu Kosan Co., Ltd., "Diana Process Oil AH-58" |
| Hydrozincite | 5 | Sakai Chemical Industry Co., Ltd., "Zinc oxide Type 1" |
| Accelerator EZ | 0.5 | Kawaguchi Chemical Industry, "ACCEL EZ" |
| Accelerator TT | 1 | Ouchi Shinko Chemical Co., "NOCCELER TT" |
| Sulfur | 1 | Tsurumi Chemical Industry Co., Ltd., "SULFAX 5" |

TABLE 4

Intermediate Rubber

| Constituent | Parts by weight | Manufacturer and product name |
|---|---|---|
| IIR | 50 | Japan Butyl Co., Ltd., "Butyl 268" |
| EPDM | 50 | JSR Corporation, "EP 93" |
| FEF carbon | 75 | Asahi Carbon Co., Ltd., "#60" |
| Calcium carbonate | 10 | Shiraishi Kogyo Kaisha Ltd., "Silver-W" |
| Aromatic oil | 15 | Idemitsu Kosan Co., Ltd., "Diana Process Oil AH-58" |
| Hydrozincite | 5 | Sakai Chemical Industry Co., Ltd., "Zinc oxide Type 1" |
| Accelerator EZ | 0.5 | Kawaguchi Chemical Industry, "ACCEL EZ" |
| Accelerator TT | 1 | Ouchi Shinko Chemical, "NOCCELER TT" |
| Sulfur | 1 | Tsurumi Chemical Industry Co., Ltd., "SULFAX 5" |

TABLE 5

Sheath Rubber

| Constituent | Parts by weight | Manufacturer and product name |
|---|---|---|
| EPDM | 100 | JSR Corporation, "EP 93" |
| FEF carbon | 100 | Asahi Carbon Co., Ltd., "#60" |
| Stearic acid | 1 | ADEKA Corporation, "Adeka Fatty Acid" |
| Paraffin oil | 70 | Idemitsu Kosan Co., Ltd., "Diana Process Oil PW-380" |
| Hydrozincite | 5 | Sakai Chemical Industry Co., Ltd., "Zinc oxide Type 1" |
| Accelerator DM | 0.5 | Ouchi Shinko Chemical, "NOCCELER DM" |
| Accelerator TT | 1 | Ouchi Shinko Chemical, "NOCCELER TT" |
| Sulfur | 1 | Tsurumi Chemical Industry Co., Ltd., "SULFAX 5" |

The impulse resistance of the resulting refrigerant transporting hoses was examined as below, and the results are shown in Tables 6 and 7.

<Impulse Resistance>

The following repeated pressure test was performed.

The inner surface of the hose was repeatedly pressurized under the conditions of 0 to 140° C., 0 to 3.3 MPa and 20 CPM, using PAG oil, and the hose was checked for breakage and for whether air tightness was ensured. The values shown in the Tables represent the numbers of operations (×10,000 times) repeated until the air tightness was impaired. The larger the value, the higher the impulse resistance.

Also, the appearance of the gas barrier layer formed by extruding the polyamide resin composition in the manufacture of the refrigerant transporting hose was visually observed and evaluated according to the following criteria. The results are shown in Tables 6 and 7.

(Criteria)

Good: Good surface state.

Fair: Slightly inferior surface state.

Bad: Poor surface state.

TABLE 6

|  |  | Example II-1 | Example II-2 | Example II-3 | Example II-4 | Example II-5 | Example II-6 | Example II-7 |
|---|---|---|---|---|---|---|---|---|
| Polyamide resin composition (wt %) | Polyamide resin | 70 | 70 | 70 | 70 | 70 | 70 | 100 |
|  | Elastomer | 15 | 15 | 15 | 15 | 15 | 15 | — |
|  | Maleic acid-modified elastomer | 15 | 15 | 15 | 15 | 15 | 15 | — |
|  | Hydrotalcite | 0.5 | 2.5 | 5 | 2.5 | 2.5 | 4 | 2.5 |
|  | Magnesium oxide | 0.5 | 2.5 | 5 | — | — | 1 | 2.5 |
|  | Zinc oxide | — | — | — | 2.5 | — | — | — |
|  | Calcium carbonate | — | — | — | — | 2.5 | — | — |
|  | Epoxy compound | — | — | — | — | — | — | — |
| Evaluation results | Retention factor (%) of strength after aging | 30 | 50 | 90 | 40 | 35 | 40 | 55 |
|  | Retention factor (%) of breaking elongation after aging | 30 | 50 | 90 | 40 | 35 | 40 | 50 |
|  | Impulse resistance | 30 | 20 | 10 | 20 | 17 | 17 | (Not measured) |
|  | Appearance of extruded resin | Good | Good | Fair | Good | Good | Good | Fair |
|  | Surface roughness Ra (μm) | 0.15 | 0.29 | 0.53 | 0.3 | 0.31 | 0.31 | 0.35 |

TABLE 7

|  |  | Comparative Example II-1 | Example II-8 | Example II-9 | Example II-10 | Example II-11 | Example II-12 | Example II-13 | Example II-14 | Example II-15 | Example II-16 |
|---|---|---|---|---|---|---|---|---|---|---|---|
| Polyamide resin composition (wt %) | Polyamide resin | 70 | 70 | 70 | 70 | 70 | 70 | 70 | 70 | 70 | 70 |
|  | Elastomer | 15 | 15 | 15 | 15 | 15 | 15 | 15 | 15 | 15 | 15 |
|  | Maleic acid-modified elastomer | 15 | 15 | 15 | 15 | 15 | 15 | 15 | 15 | 15 | 15 |
|  | Hydrotalcite | — | 1 | 5 | 10 | — | — | 1 | — | — | 2.5 |
|  | Magnesium oxide | — | — | — | — | 5 | 10 | 4 | — | — | — |
|  | Zinc oxide | — | — | — | — | — | — | — | 5 | — | — |
|  | Calcium | — | — | — | — | — | — | — | — | 5 | — |

TABLE 7-continued

|  |  | Comparative Example II-1 | Example II-8 | Example II-9 | Example II-10 | Example II-11 | Example II-12 | Example II-13 | Example II-14 | Example II-15 | Example II-16 |
|---|---|---|---|---|---|---|---|---|---|---|---|
|  | carbonate |  |  |  |  |  |  |  |  |  |  |
|  | Epoxy compound | — | — | — | — | — | — | — | — | — | 2.5 |
| Evaluation results | Retention factor (%) of strength after aging | Un-measurable | 20 | 30 | 80 | 25 | 70 | 30 | 25 | 20 | 25 |
|  | Retention factor (%) of breaking elongation after aging | 0 | 15 | 25 | 80 | 20 | 70 | 25 | 20 | 20 | 20 |
|  | Impulse resistance | 30 | 30 | 8 | 5 | 10 | 8 | 7 | 8 | 7 | Not measured |
|  | Appearance of extruded resin | Good | Good | Fair | Bad | Fair | Bad | Fair | Fair | Fair | Fair |
|  | Surface roughness Ra (μm) | 0.009 | 0.14 | 0.33 | 0.61 | 0.31 | 0.58 | 0.3 | 0.32 | 0.3 | 0.17 |

It is found from Tables 6 and 7 that the refrigerant transporting hose of the present invention using a gas barrier layer made of the polyamide resin composition containing hydrotalcite and another metal compound, magnesium oxide, is superior in durability and impulse resistance. Examples 4 and 5 and Comparative Examples 8 and 9, which use zinc oxide or calcium carbonate, have some advantage, but it is not as satisfactory as the case of using magnesium oxide. Hydrotalcite and magnesium oxide are effective.

Samples using an epoxy compound are not bad in surface roughness, but are not good in durability. Samples using both hydrotalcite and an elastomer produce a superior effect. Samples not containing an elastomer are inferior in surface roughness.

Third Embodiment

The third embodiment relates to the above-described eighth to 13th aspects. The eighth aspect is as below.

A refrigerant transporting hose according to the first embodiment and including an inner resin layer having a three-layer structure including, from the inner side, an acid-modified fluororesin layer, a polyamide resin layer and a polyamide/polyolefin elastomer composite resin layer.

Figure 2:
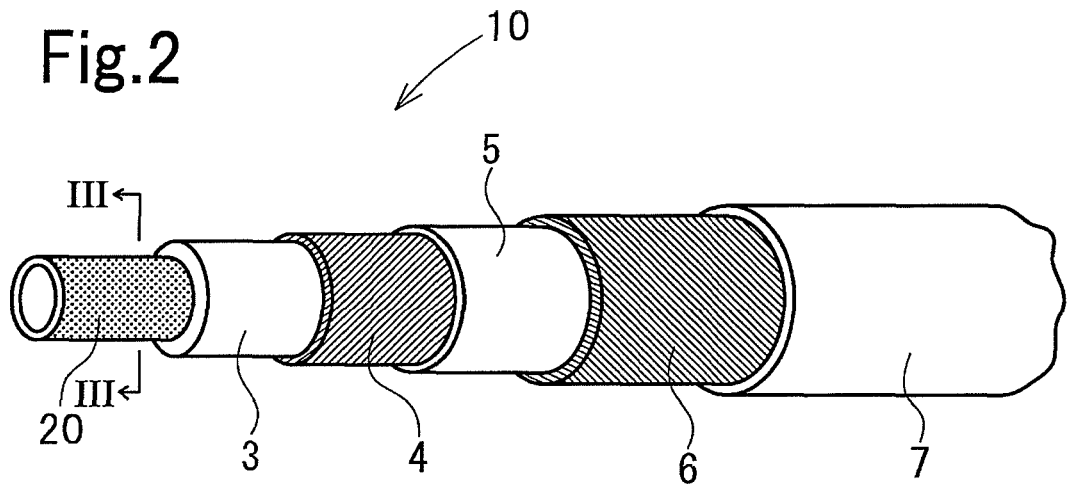
FIG. 2 is a perspective view showing a refrigerant transporting hose according to another embodiment of the present invention.
Figure 3:
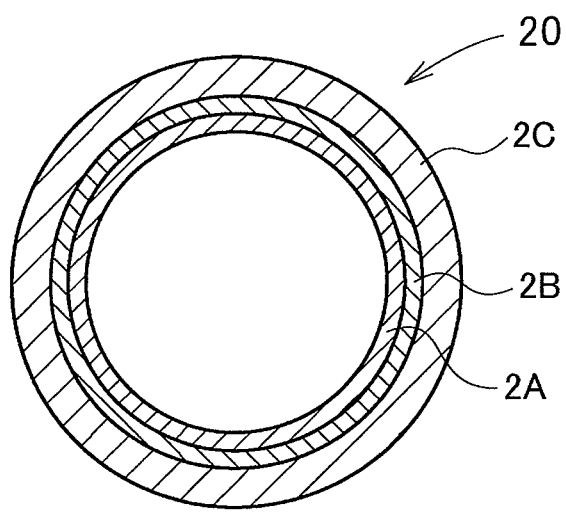
FIG. 3 is a sectional view taken along line III-III in FIG. 2.

FIG. 2 is a perspective view of the layered structure of the refrigerant transporting hose 10 of the third embodiment, and FIG. 3 is a sectional view taken along line III-III in FIG. 2, showing the layered structure of the inner surface resin layer 2.

The inner resin layer 20, which is the innermost layer of the refrigerant transporting hose 10, has a three-layer structure including an acid-modified fluororesin layer 2A as the innermost layer, a polyamide rein layer 2B as an intermediate layer, and a polyamide/polyolefin elastomer composite resin layer 2C as an outer layer. On the outer periphery of the inner resin layer 2, inner rubber layer 3 is formed, and subsequently, a first reinforcing fiber layer 4, an intermediate rubber layer 5, a second reinforcing fiber layer 6, and an rubber sheath layer 7 are formed in that order. The inner diameter of the hose 1 is generally 6 to 20 mm, and particularly about 8 to 19 mm.

[Inner Resin Layer]

The inner resin layer 20 defining the innermost layer of the refrigerant transporting hose of the third embodiment has a three-layer structure including an acid-modified fluororesin layer 2A, a polyamide resin layer 2B, and a polyamide/polyolefin elastomer composite resin layer 2C.

The material or the like of each layer will be described below.

<Acid-Modified Fluororesin Layer>

The acid-modified fluororesin layer has superior chemical stability, and is provided as the innermost layer for preventing the degradation with the refrigerant or chlorofluorocarbon or the oil from the compressor. Acid-modified fluororesins disclosed in the above-cited Patent Literatures 3 to 6 can be preferably used as the acid-modified fluororesin for this layer.

More specifically, the acid-modified fluororesin is preferably a fluorine-containing copolymer including a polymerization unit (d) based on tetrafluoroethylene, a polymerization unit (e) based on ethylene, and a polymerization unit (f) based on itaconic anhydride and/or citraconic anhydride.

In the fluorine-containing copolymer, the molar ratio (d)/(e) of the polymerization unit (d) based on tetrafluoroethylene to the polymerization unit (e) based on ethylene is preferably 20/80 to 80/20, and more preferably 50/50 to 70/30.

If the (d)/(e) molar ratio is excessively lower than the above range, the chemical resistance, heat resistance, weather resistance, gas barrier property, fuel barrier property, and other properties of the fluorine-containing copolymer are degraded. In contrast, if this molar ratio is excessively higher than the above range, the mechanical strength, melt-formability and the like are degraded. When this molar ratio is within the above range, the acid-modified fluororesin layer is superior in chemical resistance, heat resistance, gas barrier property, fuel barrier property, mechanical strength, melt-formability and other properties.

As for the content of the polymerization unit (f) based on itaconic anhydride and/or citraconic anhydride, the molar ratio (f)/((d)+(e)) is preferably 1/10000 to 5/100, more preferably 1/1000 to 5/100, still more preferably 3/2000 to 3/100, and most preferably 3/1000 to 3/100.

It the molar ratio (f)/((d)+(e)) is too low, the adhesion with the polyamide resin layer is reduced. If it is too high, the fuel barrier property is reduced. By setting this molar ratio within the above range, the adhesion to the polyamide resin layer and the fuel barrier property can be satisfactory. Itaconic anhydride and citraconic anhydride may be used singly or in combination. In combined use, the above ratio refers to their total amount.

Itaconic anhydride and citraconic anhydride may have been partially hydrolyzed prior to polymerization. For example, itaconic anhydride may be a mixture of itaconic acid and itaconic anhydride part of which has been hydrolyzed. Also, citraconic anhydride may be a mixture of citraconic acid and citraconic anhydride part of which has been hydrolyzed. The polymerization unit (f) based on itaconic anhydride and/or citraconic anhydride in the fluorine-containing copolymer may have been partially hydrolyzed after polymerization. Such a polymerization unit produced by hydrolysis before or after polymerization is considered to be a part of the polymerization unit (f). For example, the amount of polymerization unit (f) refers to the total amount of the polymerization unit based on itaconic anhydride and the polymerization unit based on itaconic acid produced from itaconic anhydride by its partial hydrolysis.

The fluorine-containing copolymer used in the third embodiment may further contain a polymerization unit (g) based on other monomers in addition to the polymerization units (d), (e) and (f).

Other monomers preferably used in the present embodiment include hydrocarbon olefins, such as propylene and butene; compounds expressed by the following formula (1); fluoroolefins having a hydrogen atom at an unsaturated group, such as vinylidene fluoride, vinyl fluoride, and trifluoroethylene; fluoroolefins other than tetrafluoroethylene, not having a hydrogen atom at an unsaturated group, such as hexafluoropropylene, chlorotrifluoroethylene, and perfluoro (alkyl vinyl ether); vinyl ethers, such as alkyl vinyl ether, (fluoroalkyl) vinyl ether, glycidyl vinyl ether, hydroxybutyl vinyl ether, and methyl vinyloxybutyl carbonate; vinyl esters, such as vinyl acetate, chlorovinyl acetate, vinyl butanoate, vinyl pivalate, vinyl benzoate, and vinyl crotonate; and (meth)acrylic esters, such as (polyfluoroalkyl)acrylate and (polyfluoroalkyl)methacrylate.

$$CH_2=CX(CF_2)_nY \quad (1)$$

(In the formula, X and Y each represent a hydrogen atom or a fluorine atom, and n represents an integer of 2 to 8.)

These monomers may be used singly or in combination.

Among those, compounds expressed by the above formula (1) are preferred as other monomers. In formula (1), the number n of difluoromethylene groups ($CF_2$) is preferably 2 to 6, more preferably 2 to 4 because such a fluorine-containing copolymer is superior in fuel barrier property and crack resistance.

Examples of the monomer expressed by the above formula (1) include $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_2H$, $CH_2=CH(CF_2)_3H$ and $CH_2=CH(CF_2)_4H$.

Among those, $CH_2=CF(CF_2)_2F$, $CH_2=CH(CF_2)_2F$, $CH_2=CH(CF_2)_2H$ or $CH_2=CF(CF_2)_2H$ are preferred, and $CH_2=CH(CF_2)_2F$ is most preferred.

Vinyl esters are also preferred as other monomers. The addition of a polymerization unit based on a vinyl ester enhances the adhesion of the fluorine-containing copolymer to the polyamide resin, and this is advantageous. Preferred vinyl esters include vinyl acetate, chlorovinyl acetate, vinyl butanoate, and vinyl pivalate. Vinyl acetate is most preferred.

When the fluorine-containing copolymer includes a polymerization unit (g) based on such other monomers, the content of the polymerization unit (g) is preferably 0.01 to 20 mol %, more preferably 0.1 to 15 mol %, and still more preferably 0.1 to 10 mol %.

The forming temperature of the fluorine-containing copolymer used in the third embodiment is preferably close to the forming temperatures of the polyamide resin and the polyamide/polyolefin elastomer composite resin so that the multilayer structure including the fluorine-containing copolymer innermost layer, the intermediate polyamide resin layer and the outer polyamide/polyolefin elastomer composite resin layer can be formed by simultaneously extruding the acid-modified fluororesin, the polyamide resin and the polyamide/polyolefin elastomer composite resin. Accordingly, the proportions of the contents of the polymerization units (d), (e) and (f) are preferably adjusted within the above range so that the melting point of the fluorine-containing copolymer can be optimized in terms of the relationship with the forming temperatures of the polyamide resin and the polyamide/polyolefin elastomer composite resin. In addition, it is preferable that the melting point of the fluorine-containing copolymer be more flexibly controlled so as to enhance the formability in coextrusion with the polyamide resin and polyamide/polyolefin elastomer composite resin of the multilayer structure, by appropriately adding a polymerization unit (g). Furthermore, by controlling the proportions of the contents of the polymerization units (f) and (g), the interlayer adhesion with the polyamide resin layer can be further enhanced.

In the third embodiment, preferably, the fluorine-containing copolymer includes as its terminal group a functional group reactive with the polyamide resin, such as ester, carbonate, hydroxy, carboxyl, carbonylfluoride, or acid anhydride, from the viewpoint of enhancing the adhesion with the polyamide resin layer. It is desirable that the terminal group be introduced with a radical polymerization initiator, a chain transfer agent or the like that is appropriately selected for producing the fluorine-containing copolymer.

The volumetric flow rate (hereinafter referred to as the "Q value") of such a fluorine-containing copolymer is preferably 1 to 1000 $mm^3/s$, more preferably 5 to 500 $mm^3/s$, and still more preferably 10 to 200 $mm^3/s$. The Q value refers to the extrusion speed of the fluorine-containing copolymer extruded into an orifice of 2.1 mm in diameter by 8 mm in length under a load of 7 kg at 297° C., using a flow tester manufactured by Shimadzu Corporation.

The Q value is an index representing the melt-fluidity of the fluorine-containing copolymer, and is a measure of its molecular weight. More specifically, the higher the Q value, the lower the molecular weight; and the lower the Q value, the higher the molecular weight. Accordingly, if the Q value is too low, extrusion becomes difficult. In contrast, if it is too high, the mechanical strength of the fluorine-containing copolymer is reduced.

The method for producing the fluorine-containing copolymer used in the third embodiment is not particularly limited, and a polymerization method using a conventional radical polymerization initiator is adopted. Examples of the polymerization method include known methods, such as bulk polymerization, solution polymerization using an organic solvent such as fluorohydrocarbon, chlorohydrocarbon, chlorofluorocarbon, alcohol or hydrocarbon, suspension polymerization using an aqueous medium and optionally an appropriate organic solvent, and emulsion polymerization using an aqueous medium and an emulsifier. Solution polymerization is most suitable. The polymerization can be performed in a batch or continuous manner using a single-tank or multi-tank stirring type polymerization apparatus, a tubular polymerization apparatus, or the like.

The radical polymerization initiator used here preferably has a 10 hour half-life decomposition temperature of 0 to 100° C., more preferably 20 to 90° C.

Examples of such a preferred radical polymerization initiator include azo compounds, such as azobisisobutyronitrile; non-fluorine diacyl peroxides, such as isobutyryl peroxide, octanoyl peroxide, benzoyl peroxide, and lauroyl peroxide; peroxydicarbonates, such as diisopropyl peroxydicarbonate; peroxy esters, such as tert-butyl peroxypivalate, tert-butyl peroxyisobutyrate, and tert-butyl peroxyacetate; fluorine-containing diacyl peroxides, such as compounds expressed by the following formula (2); and inorganic peroxide, such as potassium persulfate, sodium persulfate, and ammonium persulfate.

$$(Z(CF_2)_p COO)_2 \quad (2)$$

(where Z represents a hydrogen atom, a fluorine atom or a chlorine atom, and p represents an integer of 1 to 10.)

In the third embodiment, in order to control the Q value of the fluorine-containing copolymer in the above-described preferred range, a chain transfer agent can be desirably used.

Exemplary chain transfer agents include alcohols, such as methanol and ethanol; chlorofluorohydrocarbons, such as 1,3-dichloro-1,1,2,2,3-pentafluoropropane (produced by Asahi Glass, product name, hereinafter referred to as "AK225cb") and 1,1-dichloro-1-fluoroethane; and hydrocarbons, such as pentane, hexane, and cyclohexane.

In this instance, a chain transfer agent having a functional group such as ester, carbonate, hydroxy, carboxyl, carbonylfluoride is preferably used, as described above, because such an agent allows a terminal group reactive with the polyamide resin to be introduced to the fluorine-containing copolymer. Such chain transfer agents include acetic acid, acetic anhydride, methyl acetate, ethylene glycol, and propylene glycol.

The conditions for polymerizing the fluorine-containing copolymer used in the third embodiment are not particularly limited. The polymerization temperature is preferably 0 to 100° C., and more preferably 20 to 90° C. Also, the polymerization pressure is preferably 0.1 to 10 MPa, and more preferably 0.5 to 3 MPa. In addition, the polymerization time is preferably 1 to 30 hours.

If the concentration of itaconic anhydride and/or citraconic anhydride is too high in the reaction system during polymerization, the polymerization speed tends to decrease. Accordingly, the concentration of itaconic anhydride and/or citraconic anhydride (total concentration, if they are used in combination) is preferably 0.001% to 5%, more preferably 0.01% to 3%, and most preferably 0.01% to 1%, in terms of molar ratio, relative to the total tetrafluoroethylene and ethylene. When the itaconic anhydride concentration is in these ranges, the polymerization speed during production does not substantially decrease, and the adhesion of the fluorine-containing copolymer to the polyamide resin is increased. Preferably, as itaconic anhydride and/or citraconic anhydride are consumed by polymerization, itaconic anhydride and/or citraconic anhydride in an amount equal to the consumption are continuously or intermittently supplied to the polymerization tank during the polymerization to maintain their concentration in the above range.

In the third embodiment, the thickness of the acid-modified fluororesin layer made of the fluorine-containing copolymer is preferably 100 μm or less, and more preferably 50 to 100 μm. An acid-modified fluororesin layer having a thickness of more than 100 μm is undesirable. In such a case, the flexural rigidity tends to increase and thus degrade the impulse resistance, and the total thickness of the inner resin layer is increased to increase the thickness of the resulting refrigerant transporting hose. If the thickness of the acid-modified fluororesin layer is too small, the acid-modified fluororesin layer cannot sufficiently produce the effect of improving the chemical durability of the entire inner resin layer of the hose (that is, the function of protecting the polyamide resin layer or the polyamide/polyolefin elastomer composite resin layer from degradation).

<Polyamide Resin Layer>

The polyamide resin layer is intended to ensure a gas barrier property. The description of the polyamide resin used for the polyamide resin layer is the same as in the first embodiment, and the description in the first embodiment is incorporated.

The polyamide resin layer may be composed of only a polyamide resin, or may contain additives, such as a lubricant, an antistatic agent, an antiaging agent, an antioxidant, a coloring agent, a crystal nucleating agent, a filler, a reinforcing agent, a heat resisting agent, and a light resisting agent, in addition to the polyamide resin.

Preferably, the polyamide resin layer contains a metal compound selected from the group consisting of hydroxides, oxides and basic salts such as carbonates, of divalent and trivalent metals (hereinafter this metal compound is referred to as a "specific metal compound"). By adding such a specific metal compound, the degradation with the refrigerant or chlorofluorocarbon, or the oil from the compressor can be further prevented with reliability.

Exemplary divalent and trivalent metals include magnesium, iron, zinc, calcium, nickel, cobalt, copper and other divalent metals, and aluminum, iron, manganese and other trivalent metals.

Examples of the hydroxides, oxides and basic salts of these metals include hydrotalcite, magnesium oxide, magnesium hydroxide, aluminum hydroxide, calcium oxide, and calcium carbonate. Among these, hydrotalcite is preferred because it is expected to have a superior function of accepting acids.

These specific metal compounds may be used singly or in a combination of at least two desired compounds in desired proportions.

Preferred examples of the hydrotalcite are the same as in the first embodiment, and their description in the first embodiment is incorporated.

As for the specific metal compound content, if it is too low, the effect of the metal compound to prevent degradation cannot be sufficiently produced. If it is too high, the effect is not as high as that expected from the amount of the metal compound added, and properties such as gas barrier property, flexibility, and aging resistance are disadvantageously degraded. Therefore, the content of the specific metal compound in the polyamide resin layer is preferably 0.4% by weight or more, and particularly 1.0% to 5.0% by weight.

In the third embodiment, the thickness of such a polyamide resin layer is preferably 100 μm or less, and more preferably 50 to 100 μm. If the thickness of the polyamide resin layer exceeds 100 μm, the flexibility of the resin layer is degraded, and the durability of the hose, such as impulse resistance, is significantly impaired. Furthermore, the total thickness of the inner resin layer is increased, and accordingly the thickness of the resulting refrigerant transporting hose is undesirably increased. If the thickness of the polyamide resin layer is too small, the polyamide resin layer cannot sufficiently provide a high gas barrier property.

<Polyamide/Polyolefin Elastomer Composite Resin Layer>

The polyamide/polyolefin elastomer composite resin layer is intended to impart gas barrier property, flexibility and durability, and is made of a polyamide/polyolefin elastomer composite resin containing a polyamide resin and a polyolefin elastomer.

At least one of the polyamide resins cited above as the polyamide resin of the polyamide resin layer can be used as the polyamide resin of the polyamide/polyolefin elastomer composite resin layer. The polyamide resin of the polyamide resin layer and the polyamide resin of the polyamide/polyolefin elastomer composite resin layer are not necessarily the same. However, the use of a common polyamide resin facilitates material management, and tends to enhance the adhesion between the polyamide resin layer and the polyamide/polyolefin elastomer composite resin layer.

The description of the olefin elastomer of the polyamide/polyolefin elastomer composite resin layer is the same as in the first embodiment, and the description in the first embodiment is incorporated.

The polyamide/polyolefin elastomer composite resin of the polyamide/polyolefin elastomer composite resin layer may contain other resin components in addition to the polyamide resin. In this instance, it is preferable that the polyamide resin accounts for 70% by weight or more of the total polymer component in the polyamide/polyolefin elastomer composite resin, from the viewpoint of ensuring a gas barrier property.

Such other resin components include ethylene-vinyl alcohol resin.

Also, the polyamide/polyolefin elastomer composite resin may contain other additives, such as a lubricant, an anti-static agent, an antiaging agent, an antioxidant, a coloring agent, a crystal nucleating agent, a filler, a reinforcing agent, a heat resisting agent, and a light resisting agent.

In particular, the polyamide/polyolefin elastomer composite resin layer, as well, preferably contains at least one of the specific metal compounds cited as an additive used in the above-described polyamide resin layer. In this instance, the content of the specific metal compound in the polyamide/polyolefin elastomer composite resin layer is preferably 0.4% by weight or more, particularly 1.0% to 5.0% by weight, for the same reason as in the polyamide resin layer.

In the third embodiment, the thickness of such a polyamide/polyolefin elastomer composite resin layer is preferably 50 μm or more, and more preferably 100 to 200 μm. If the thickness of the polyamide/polyolefin composite resin layer is less than 50 μm, the polyamide/polyolefin elastomer composite resin layer cannot sufficiently produce the effect of improving the flexibility and the durability, such as impulse resistance. In contrast, if the thickness of the polyamide/polyolefin elastomer composite resin layer is too large, the total thickness of the inner resin layer is increased, and accordingly the thickness of the resulting refrigerant transporting hose is undesirably increased.

<Thickness of Inner Resin Layer>

The total thickness of the inner resin layer of the present invention, having the three-layer structure including the acid-modified fluororesin layer, the polyamide resin layer, and the polyamide/polyolefin elastomer composite resin layer is preferably 150 to 350 μm, and particularly 200 to 300 μm. In order to establish the three-layer structure with the above-described effects of the layers ensured, it is preferable that at least the inner resin layer have a thickness within the above range. From the viewpoint of preventing the increase in the thickness of the refrigerant transporting hose of the present invention, including such an inner resin layer, the thickness of the inner resin layer is preferably lower than or equal to the upper limit of the above range.

[Other Layers]

The refrigerant transporting hose of the third embodiment may further include an inner rubber layer as the innermost layer on the inner side of the inner resin layer 20 in the structure of the refrigerant transforming hose 10 shown in FIG. 2.

Other components of the refrigerant transporting hose of the third embodiment are not particularly limited, and a typical refrigerant transporting hose as described below may be used.

The description of the inner rubber layer 3, the rubber sheath layer 7, the intermediate rubber layer 5, and the reinforcing fiber layers 4 and 6 are the same as in the first embodiment, and the description in the first embodiment is incorporated.

[Method for manufacturing Refrigerant Transporting Hose]

The refrigerant transporting hose of the third embodiment can be manufactured according to an ordinary process, by extruding the materials of the inner resin layer 2 including the acid-modified resin layer 2A, the polyamide resin layer 2B and the polyamide/polyolefin elastomer composite resin layer 2C, and the inner rubber layer 3 to predetermined thicknesses on a mandrel, then winding the reinforcing fiber layer 4 around the layered structure, subsequently forming the intermediate rubber layer 5 by extrusion, and winding the reinforcing fiber layer 6 around the underlying layer, and forming the rubber sheath layer 7 by extrusion. The resulting structure is vulcanized at 140 to 170° C. for 30 to 120 minutes.

Examples and Comparative Examples of the Third Embodiment

The third embodiment will now be further described with reference to examples and comparative examples.

Examples III-1 to III-3, Comparative Examples III-1 to III-7

The following materials A to E were prepared as the constituents of the inner resin layer.

A: Acid-modified ethylene/tetrafluoroethylene copolymer

Fluorine-containing copolymer "Floun AH-2000" produced by Asahi Glass Co., Ltd.

B: Polyamide resin, nylon 6 "1022B" produced by Ube Industries

C: Hydrotalcite-containing polyamide resin

Prepared by mixing and kneading 99.5 parts by weight of the above polyamide resin B and 0.5 parts by weight of "Hydrotalcite DHT-4A" (compositional formula: $Mg_{4.5}Al_2(OH)_{13}CO_3.3.5H_2O$) produced by Kyowa Chemical at a controlled temperature of 260° C. and a screw rotation speed of 150 rpm, using a twin screw kneader TEX-30 (screw diameter: 30 mm, L/D=40) manufactured by Japan Steel Works.

D: Polyamide resin/acid-modified polyethylene elastomer alloy

Prepared by mixing and kneading 62.0 parts by weight of the above polyamide resin B and 38 parts by weight of maleic acid-modified α-olefin polymer (ethylene-butene copolymer) "TAFMER MH7020" produced by Mitsui Chemicals at a controlled temperature of 260° C. and a screw rotation speed of 150 rpm, using a twin screw kneader TEX-30 (screw diameter: 30 mm, L/D=40) manufactured by Japan Steel Works.

E: Hydrotalcite-containing polyamide resin/acid-modified polyethylene elastomer alloy Prepared by mixing and kneading 62.0 parts by weight of the above polyamide resin B, 37.5 parts by weight of maleic acid-modified α-olefin polymer used in the above D, and 0.5 parts by weight of hydrotalcite used in the above C at a controlled temperature of 260° C. and a screw rotation speed of 150 rpm, using a twin screw kneader TEX-30 (screw diameter: 30 mm, L/D=40) manufactured by Japan Steel Works.

The above materials D and E had an alloy structure including a nylon 6 sea phase, and elastomer island phases of about 1 μm in diameter, in which submicron dots of nylon 6 were dispersed in the elastomer island phases.

The refrigerant transporting hose shown in FIG. 1 was produced using the materials of the inner resin layer shown in Table 3. However, the intermediate rubber layer was not formed.

Each layer of the inner resin layer shown in Table 3 was extruded to the thickness shown in Table 3 on a rubber mandrel of 13 mm in diameter, thus forming the inner resin layer 2. Then, an inner rubber was extruded to a thickness of 1.5 mm to form the inner rubber layer 3. On the resulting layer, the first reinforcing fiber layer 4 and the second reinforcing fiber layer 6 were formed in a spiral manner using 24 PET fiber strands of 4000 dtex/4 with a twisting angle of 54°. The first reinforcing fiber layer and the second reinforcing fiber layer were wound in the opposite directions at certain angles. Then, a sheath rubber was extruded to a thickness of 1.3 mm to form a rubber sheath layer 7 on the reinforcing fiber layers, and was vulcanized at 150° C. for 1 hour. Thus, a refrigerant transporting hose was completed, having an inner diameter of 13 mm and an outer diameter of 21 mm.

The proportions of the rubber in the inner rubber layer and the rubber sheath layer are shown in Tables 8 and 9.

TABLE 8

Inner Rubber Composition

| Constituent | Parts by weight | |
|---|---|---|
| IIR | 100.0 | Japan Butyl Co., Ltd., "Butyl 268" |
| FEF carbon | 60.0 | Asahi Carbon Co., Ltd., "#60" |
| Stearic acid | 1.0 | ADEKA Corporation, "Adeka Fatty Acid" |
| Zinc oxide | 5.0 | Sakai Chemical Industry Co., Ltd., "Zinc Oxide type 1" |
| Accelerator TT | 1.5 | Ouchi Shinko Chemical, "NOCCELER TT" |
| Sulfur | 1.5 | Tsurumi Chemical Industry Co., Ltd., "SULFAX 5" |

TABLE 9

Rubber sheath Layer

| Constituent | Parts by weight | |
|---|---|---|
| EPDM | 100.0 | JSR Corporation, "EP 93" |
| FEF carbon | 100.0 | Asahi Carbon Co., Ltd., "#60" |
| Stearic acid | 1.0 | ADEKA Corporation, "Adeka Fatty Acid" |
| Oil | 60.0 | Idemitsu Kosan Co., Ltd., "Diana Process PW-380" |
| Zinc oxide | 5.0 | Sakai Chemical Industry Co., Ltd., "Zinc Oxide type 1" |
| Accelerator TT | 1.0 | Ouchi Shinko Chemical, "NOCCELER TT" |
| Sulfur | 1.0 | Tsurumi Chemical Industry Co., Ltd., "SULFAX 5" |

The properties of the resulting refrigerant transporting hoses were examined as below, and the results are shown in Table 10.

<Flexural Rigidity>

The center of each hose was pushed at a roller span of 200 mm, at a speed of 500 mm/min, and the maximum bending reaction force was measured until being kinked. The results are represented as indices to the reaction force of the hose of Comparative Example 4 which was represented as 100. The lower this value, the lower the flexural rigidity, and the higher the flexibility.

<Gas Barrier Property>

Both ends of the hose of 1 m in length were crimped, and 0.6 g/cm3 of a refrigerant R-134a was sealed. The sample was allowed to stand in an oven of 90° C., and the amount of gas permeation was calculated from the decrease in weight. The results are represented as indices to the gas permeation of the hose in Comparative Example 4 which was represented as 100. The lower the value, the higher the gas barrier property.

<Impulse Resistance>

Both ends of the hose of 1 m in length were Crimped, and a pressure cycle of 0 MPa→3.5 MPa→0 MPa was repeated in such a manner that the pressure was increased over 2 hours and held for 2 hours using PAG oil at 15 CPM. Thus the number of repetitions of pressuring was measured until the hose was burst. The higher the value, the higher the impulse resistance.

<Aging Resistance Against Sealing>

Both ends of the hose of 500 mm in length were crimped. One end was equipped with a canister, and the hose was charged with 100% of an oil, 20% of refrigerant gas (R-134a), and 1% of waster relative to the inner capacity of the hose, and subjected to an aging test at 140° C. for 4 weeks. After the test, the hose was opened, and the elongation of the inner resin layer was measured with a tensile tester STROGRAPH manufactured by Toyo Seiki Co., Ltd. The percentage of the elongation after the aging test was calculated relative to the elongation of the inner resin layer measured in the same manner before the aging test. The higher the value, the higher the aging resistance.

TABLE 10

| | | Comparative Example | | | | | | | Example | | |
|---|---|---|---|---|---|---|---|---|---|---|---|
| | | III-1 | III-2 | III-3 | III-4 | III-5 | III-6 | III-7 | III-1 | III-2 | III-3 |
| Inner resin layer materials (Parenthesized number represents thickness: μm) | Innermost layer | A (300) | B (300) | C (300) | D (300) | E (300) | A (150) | A (50) | A (100) | A (50) | A (50) |
| | Intermediate layer | | | | | | B (150) | B (50) | B (100) | B (50) | B (50) |
| | Outer layer | | | | | | — | C (200) | D (100) | D (200) | E (200) |
| Evaluation results | Flexural rigidity | 185 | 130 | 130 | 100 | 100 | 163 | 120 | 120 | 110 | 110 |
| | Gas barrier property | 2650 | 31 | 32 | 100 | 100 | 68 | 90 | 85 | 92 | 93 |
| | Impulse resistance | 20,000 times or less | 40,000 times or less | 40,000 times or less | 150,000 times or more OK | 150,000 times or more OK | 30,000 times or less | 30,000 times or less | 150,000 times or more OK | 150,000 times or more OK | 150,000 times or more OK |

TABLE 10-continued

| | Comparative Example | | | | | | | Example | | |
|---|---|---|---|---|---|---|---|---|---|---|
| | III-1 | III-2 | III-3 | III-4 | III-5 | III-6 | III-7 | III-1 | III-2 | III-3 |
| Aging resistance against sealing | 90% or more | 10% or less | 25% or less | 10% or less | 35% or less | 75% or more | 85% or more | 75% or more | 75% or more | 85% or more |

Table 10 clearly shows that:

Comparative Example III-1, whose inner resin layer has a single-layer structure made of an acid-modified fluororesin, is superior in aging resistance, but inferior in gas barrier property, flexibility and impulse resistance.

Comparative Example III-2, whose inner resin layer has a single-layer structure made of a polyamide resin, is satisfactory in gas barrier property, but is inferior in aging resistance and impulse resistance. Comparative Example 3, in which hydrotalcite was added to the polyamide resin, exhibited slightly improved aging resistance and impulse resistance relative to Comparative Example 2, but it is not satisfactory.

Comparative Example 4, whose inner resin layer has a single layer structure made of a polyamide/polyolefin elastomer composite resin, is superior in impulse resistance, but inferior in aging resistance. Comparative Example 5, in which hydrotalcite was added to the polyamide/polyolefin elastomer composite resin, exhibited slightly improved aging resistance relative to Comparative Example 4, but it is not satisfactory.

Comparative Example 6, whose inner resin layer has a double-layer structure including an acid-modified fluororesin layer and a polyamide resin layer, is satisfactory in gas barrier property and aging resistance, but is inferior in flexibility and impulse resistance.

Comparative Example 7, whose inner resin layer has a three-layer structure including an acid-modified fluororesin layer, a polyamide resin layer, and a hydrotalcite-containing polyamide resin layer, is superior in flexibility, gas barrier property and aging resistance, but is inferior in impulse resistance.

On the other hand, Examples III-1 to III-3, whose inner resin layer has a three-layer structure including an acid-modified fluororesin layer, a polyamide resin layer, a polyamide/polyolefin elastomer composite resin layer, are superior in flexibility, gas barrier property, impulse resistance and aging resistance. In particular, Example III-3, in which hydrotalcite is added to the polyamide/polyolefin elastomer composite resin, the aging resistance can be further improved.

Fourth Embodiment

A fourth embodiment will now be described in detail.

The Fourth embodiment relates to the above-described 17th to 25th aspects. The 17th aspect is as below.

A method for producing a polyamide resin composition containing a polyamide resin, a polyolefin elastomer, and at least one metal compound selected from the group consisting of hydroxides, oxides and carbonates of divalent and trivalent metals, the method includes:

the first mixing step of mixing and kneading the metal compound and the polyolefin elastomer; and the second mixing step of mixing and kneading the mixture prepared in the first mixing step and the polyamide resin.

[Polyamide Resin Composition and Method for Producing the Same]

First, a method for producing a polyamide resin composition, and a polyamide resin composition produced by the method for producing a polyamide resin composition, according to the fourth embodiment will be described.

<(a) Polyamide Resin>

The description of the polyamide resin used in the fourth embodiment is the same as in the first embodiment, and the description in the first embodiment is incorporated.

<(b) Polyolefin Elastomer>

The polyamide resin composition of the fourth embodiment contains a polyolefin elastomer. By adding a polyolefin elastomer, flexibility and durability can be imparted to the gas barrier layer made of the polyamide resin composition.

The description of the olefin elastomer is the same as in the first embodiment, and the description in the first embodiment is incorporated.

<(C) Metal Compound>

The metal compound contained in the polyamide resin composition of the fourth embodiment is selected from the group consisting of hydroxides, oxides and carbonates of divalent and trivalent metals.

Exemplary divalent and trivalent metals include magnesium, iron, zinc, calcium, nickel, cobalt, copper and other divalent metals, and aluminum, iron, manganese and other trivalent metals.

Examples of the hydroxides, oxides and carbonates of these metals include hydrotalcite, magnesium oxide, magnesium hydroxide, aluminum hydroxide, calcium oxide, and calcium carbonate. Among these, hydrotalcite is preferred because it is expected to have a superior function of accepting acids.

These metal compounds may be used singly or in a combination of at least two desired compounds in desired proportion.

The description of hydrotalcite is the same as in the first embodiment, and the description in the first embodiment is incorporated.

As for the metal compound content in the polyamide resin composition, if it is too low, the effect of the metal compound to prevent degradation cannot be sufficiently produced though it is added. If it is too high, the effect is not as high as that expected from the amount of the metal compound added, and properties such as gas barrier property, flexibility, and aging resistance are disadvantageously degraded. Accordingly, the metal compound content in the polyamide resin composition is preferably set to 5% to 20% by weight, more preferably 5% to 15% by weight, relative to the polymer component. Thus, it is preferable that a relatively large amount of metal compound be added, from the viewpoint of sufficiently producing the effect of the metal compound to prevent degradation, and ensuring durability. In addition, according to the present invention, even if such a large amount of metal compound is added, superior impulse resistance can be exhibited. However, if the metal compound content is too high, the extruded film of the resin composition may have a poor surface state because the metal compound cannot be sufficiently dispersed even by the mixing technique of the present embodiment. Preferably, the metal compound content is less than or equal to the above mentioned upper limit.

The polymer component in the polyamide resin composition refers to all the polymer components including (a) the polyamide resin, (b) the polyolefin elastomer, and other resins and the like that may be optionally added.

<Other Constituents>

The polyamide resin composition in the fourth embodiment may contain other resin components in addition to the polyamide resin. In this instance, however, it is preferable that the polyamide resin accounts for 70% by weight or more in all the polymer components in the refrigerant transporting hose, from the viewpoint of ensuring a gas barrier property.

Such other resin components include ethylene-vinyl alcohol resin.

Also, the polyamide resin composition of the fourth embodiment may contain other additives, such as a lubricant, an anti-static agent, an antiaging agent, an antioxidant, a coloring agent, a crystal nucleating agent, a filler, a reinforcing agent, a heat resisting agent, and a light-resisting agent.

<Method for Producing Polyamide Resin Composition>

For producing the polyamide resin composition in the fourth embodiment, as described above, a two-step mixing is performed in which (b) a polyolefin elastomer and (c) a metal compound are first mixed and kneaded together, and (a) a polyamide resin is mixed to the resulting mixture and kneaded together to yield a polymer alloy.

As for the condition of the heating temperature for the step of mixing the polyolefin elastomer and the metal compound, it is preferably set, rather low, to the extent that the elastomer can flow so as to prevent the elastomer from being degraded by heat. Although the heating temperature depends on the polyolefin elastomer used, it may be about 150 to 230° C., for example, in the case of TAFMER A-1050S used in the below described Examples.

In the fourth embodiment, since it is preferable that the polyamide resin be mixed subsequent to the mixing of the polyolefin elastomer and the metal compound, as described above, the heating temperature for mixing is preferably such that the elastomer is not degraded and can flow, and is higher than or equal to the melting point of the polyamide resin. For example, the mixing is preferably performed with heating at a temperature about 10 to 60° C. higher than the melting point of the polyamide resin (first mixing step).

This mixing can be performed to the extent that the metal compound can be sufficiently dispersed in the polyolefin elastomer, and the mixing time and other conditions are not particularly limited.

Subsequently, a polyamide resin is added to the mixture prepared by mixing the polyolefin elastomer and the metal compound and kneaded together (second mixing process). This mixing operation is performed under the same conditions as the first mixing step.

In the fourth embodiment, only part of the polyolefin elastomer used in the production of the composition may be mixed in the first mixing step, and the rest of the polyolefin elastomer may be added and kneaded in the second mixing step. However, from the viewpoint of uniformly dispersing the metal compound, as described above, it is preferable that at least 70% by weight, more preferably the entirety, of the polyolefin elastomer to be used be mixed with the metal compound in the first mixing step. For the same reason, preferably, the polyamide resin is not added in the first mixing step, but its entirety used in the production of the composition is added and kneaded in the second mixing step.

For adding the above-described other constituents that may be optionally added to the polyamide resin composition, such constituents may be added and kneaded in the first mixing step or in the second mixing step.

The polyolefin elastomer and the metal compound may have been mixed and kneaded together to prepare a masterbatch, and the polyamide resin may be added to the masterbatch. However, it is efficient to mix the polyolefin elastomer and the metal compound together and then add the polyamide resin.

[Refrigerant Transporting Hose]

The refrigerant transporting hose including the gas barrier layer made of the polyamide resin composition produced by the method of the fourth embodiment has the structure shown in FIG. 1. Its description is the same as in the first embodiment, and the description in the first embodiment is incorporated.

The fourth embodiment will now be further described with reference to examples, reference examples and comparative examples.

Examples IV-1 to IV-10, Reference Examples IV-1 and IV-2, Comparative Examples IV-1 to IV-7

Materials were mixed and kneaded according to the compositions shown in Tables 14 and 15 to prepare a polyamide resin composition.

For mixing, the materials were mixed and kneaded at a temperature of 230° C., higher than or equal to the melting point (220° C.) of the polyamide resin, using a twin screw kneader manufactured by Toyo Seiki. Mixing was performed in two steps: an elastomer and hydrotalcite were mixed and kneaded together in the first step, and the elastomer containing the hydrotalcite and a polyamide resin were mixed and kneaded together in the second step (Two-step kneading A: Examples IV-1 to IV-10, Reference Examples IV-1 and IV-2).

For comparison, the following polyamide resin compositions were prepared in the same manner: composition not containing hydrotalcite (Comparative Example IV-1); composition produced by adding hydrotalcite to a polymer alloy prepared in advance by mixing a polyamide resin and an elastomer together (after-addition: Comparative Example IV-2); and compositions produced by reversing the mixing order, that is, by mixing a polyamide resin and hydrotalcite together in advance, and then adding an elastomer to the mixture (Two-step kneading B: Comparative Examples IV-3 to IV-7).

The materials used in the preparation of polyamide resin compositions were as follows:

Polyamide resin: Nylon 6 "1022B" produced by Ube Industries

Elastomer: α-olefin polymer (ethylene-butene copolymer) "TAFMER A-1050S" produced by Mitsui Chemicals Maleic acid-modified elastomer: α-olefin polymer (ethylene-butene copolymer) "TAFMER MH-7010" produced by Mitsui Chemicals Hydrotalcite: "Hydrotalcite DHT-4A" produced by Kyowa Chemical Composition formula: $Mg_{4.5}Al_2(OH)_{13}CO_3 \cdot 3.5H_2O$ Test samples made of polyamide resin compositions were subjected to evaluation according to the following method, and the results are shown in Tables 14 and 15.

The methods for measuring retention factors of the strength after aging and the breaking elongation after aging are the same as in the first embodiment, and their descriptions in the first embodiment are incorporated.

Refrigerant transporting hoses shown in FIG. 1 were produced by the following method using the polyamide resin compositions.

The polyamide resin composition was extruded onto a mandrel having a diameter of 11 mm to form a 200 μm thick gas barrier layer 2, and then an inner rubber layer 3 was formed by extruding an inner rubber to a thickness of 1.60 mm. Twenty two polyester reinforcing threads of 1100 dtex/4 and 10 twists/10 cm were wound together around the underlying layer in a spiral manner. An intermediate rubber layer 5 was extruded to a thickness of 0.30 mm onto the resulting first reinforcing fiber layer 4, and a second reinforcing layer 6 was further formed by winging 22 polyester reinforcing threads of 1100 dtex/4 and 10 twists/10 cm together around the intermediate rubber layer 5 in a spiral manner in the opposite direction to the above. Then, a sheath rubber was extruded to a thickness of 1.2 mm to form a rubber sheath layer 7 on the second reinforcing fiber layer, and was vulcanized at 150° C. for 45 minutes. Thus, a refrigerant transporting hose was completed, having an inner diameter of 11 mm and an outer diameter of 19 mm.

The proportions of the rubber in the inner rubber layer, the intermediate rubber layer and the rubber sheath layer are shown in Tables 11 to 13.

TABLE 11

Inner Rubber

| Constituent | Parts by weight | Manufacturer and product name |
|---|---|---|
| IIR | 100 | Japan Butyl Co., Ltd., "Butyl 268" |
| FEF carbon | 65 | Asahi Carbon Co., Ltd., "#60" |
| Stearic acid | 1 | ADEKA Corporation, "Adeka Fatty Acid" |
| Aromatic oil | 5 | Idemitsu Kosan Co., Ltd., "Diana Process Oil AH-58" |
| Hydrozincite | 5 | Sakai Chemical Industry Co., Ltd., "Zinc oxide Type 1" |
| Accelerator EZ | 0.5 | Kawaguchi Chemical Industry, "ACCEL EZ" |
| Accelerator TT | 1 | Ouchi Shinko Chemical Co., "NOCCELER TT" |
| Sulfur | 1 | Tsurumi Chemical Industry Co., Ltd., "SULFAX 5" |

TABLE 12

Intermediate Rubber

| Constituent | Parts by weight | Manufacturer and product name |
|---|---|---|
| IIR | 50 | Japan Butyl Co., Ltd., "Butyl 268" |
| EPDM | 50 | JSR Corporation, "EP 93" |
| FEF carbon | 75 | Asahi Carbon Co., Ltd., "#60" |
| Calcium carbonate | 10 | Shiraishi Kogyo Kaisha Ltd., "Silver-W" |
| Aromatic oil | 15 | Idemitsu Kosan Co., Ltd., "Diana Process Oil AH-58" |
| Hydrozincite | 5 | Sakai Chemical Industry Co., Ltd., "Zinc oxide Type 1" |
| Accelerator EZ | 0.5 | Kawaguchi Chemical Industry, "ACCEL EZ" |
| Accelerator TT | 1 | Ouchi Shinko Chemical, "NOCCELER TT" |
| Sulfur | 1 | Tsurumi Chemical Industry Co., Ltd., "SULFAX 5" |

TABLE 13

Sheath Rubber

| Constituent | Parts by weight | Manufacturer and product name |
|---|---|---|
| EPDM | 100 | JSR Corporation, "EP 93" |
| FEF carbon | 100 | Asahi Carbon Co., Ltd., "#60" |
| Stearic acid | 1 | ADEKA Corporation, "Adeka Fatty Acid" |
| Paraffin oil | 70 | Idemitsu Kosan Co., Ltd., "Diana Process Oil PW-380" |
| Hydrozincite | 5 | Sakai Chemical Industry Co., Ltd., "Zinc oxide Type 1" |
| Accelerator DM | 0.5 | Ouchi Shinko Chemical, "NOCCELER DM" |
| Accelerator TT | 1 | Ouchi Shinko Chemical, "NOCCELER TT" |
| Sulfur | 1 | Tsurumi Chemical Industry Co., Ltd., "SULFAX 5" |

The impulse resistance of the resulting refrigerant transporting hoses was examined as below, and the results are shown in Tables 14 and 15.

<Impulse Resistance>

The following repeated pressure test was performed.

The inner surface of the hose was repeatedly pressurized under the conditions of 0 to 140° C., 0 to 3.3 MPa and 20 CPM, using PAG oil, and the hose was checked for breakage and for whether air tightness was ensured. The values shown in the Tables represent the numbers of operations (×10,000 times) repeated until the air tightness was impaired. The larger the value, the higher the impulse resistance.

Also, the appearance of the gas barrier layer formed by extruding the polyamide resin composition in the manufacture of the refrigerant transporting hose was visually observed and evaluated according to the following criteria. The results are shown in Tables 14 and 15.

(Criteria)

Good: Good surface state.

Fair: Slightly inferior surface state.

Bad: Poor surface state.

TABLE 14

| | | Example | | | | | | | | | |
|---|---|---|---|---|---|---|---|---|---|---|---|
| | | IV-1 | IV-2 | IV-3 | IV-4 | IV-5 | IV-6 | IV-7 | IV-8 | IV-9 | IV-10 |
| Polyamide resin composition (wt %) | Polyamide resin | 70 | 70 | 70 | 70 | 70 | 70 | 70 | 95 | 90 | 55 |
| | Elastomer | 15 | 15 | 15 | 15 | 15 | 15 | 15 | 5 | 5 | 25 |
| | Maleic acid-modified elastomer | 15 | 15 | 15 | 15 | 15 | 15 | 15 | | 5 | 20 |
| | Hydrotalcite | 5 | 10 | 15 | 20 | | 5 | 5 | 5 | 5 | 5 |
| | Magnesium oxide | | | | | | | 5 | | | |
| | Zinc oxide | | | | | 10 | 5 | | | | |
| | Mixing and kneading procedure | 2-step mixing and kneading A | | | | | | | | | |
| Evaluation results | Retention factor of strength after aging (%) | 65 | 75 | 85 | 90 | 70 | 80 | 80 | 55 | 60 | 70 |
| | Retention factor of breaking elongation after aging (%) | 65 | 75 | 80 | 90 | 70 | 75 | 80 | 55 | 55 | 65 |

TABLE 14-continued

|  | Example | | | | | | | | | |
|---|---|---|---|---|---|---|---|---|---|---|
|  | IV-1 | IV-2 | IV-3 | IV-4 | IV-5 | IV-6 | IV-7 | IV-8 | IV-9 | IV-10 |
| Impulse resistance | 30 | 30 | 25 | 15 | 30 | 30 | 30 | — | — | — |
| Surface roughness Ra (μm) | 0.15 | 0.21 | 0.27 | 0.35 | 0.2 | 0.2 | 0.19 | 0.28 | 0.24 | 0.14 |
| Appearance after resin extrusion | Good | Good | Good | Fair | Good | Good | Good | Good | Good | Good |

TABLE 15

|  |  | Refernce Example | | Comparative Example | | | | | | |
|---|---|---|---|---|---|---|---|---|---|---|
|  |  | IV-1 | IV-2 | IV-1 | IV-2 | IV-3 | IV-4 | IV-5 | IV-6 | IV-7 |
| Polyamide resin composition (wt %) | Polyamide resin | 70 | 70 | 70 | 70 | 70 | 70 | 95 | 90 | 55 |
|  | Elastomer | 15 | 15 | 15 | 15 | 15 | 15 | 5 | 5 | 25 |
|  | Maleic acid-modified elastomer | 15 | 15 | 15 | 15 | 15 | 15 |  | 5 | 20 |
|  | Hydrotalcite | 1 | 25 | — | 5 | 5 | 10 | 5 | 5 | 5 |
|  | Magnesium oxide |  |  |  |  |  |  |  |  |  |
|  | Zinc oxide |  |  |  |  |  |  |  |  |  |
| Mixing and kneading procedure |  | 2-step mixing and kneading A | | No addition | After-addition | 2-step mixing and kneading B | | | | |
| Evaluation results | Retention factor of strength after aging (%) | 10 | 95 | Unmeasurable | 30 | 70 | 85 | 60 | 65 | 75 |
|  | Retention factor of breaking elongation after aging (%) | 10 | 90 | 0 | 20 | 70 | 80 | 60 | 60 | 70 |
|  | Impulse resistance | 30 | 5 | 30 | 8 | 10 | 5 | — | — | — |
|  | Surface roughness Ra (μm) | 0.14 | 0.59 | 0.009 | 0.33 | 0.35 | 0.65 | 0.35 | 0.3 | 0.19 |
|  | Appearance after resin extrusion | Good | Bad | Good | Fair | Fair | Bad | Fair | Fair | Good |

It is found from Tables 14 and 15 that the refrigerant transporting hose of the present invention whose gas barrier layer was made of a polyamide resin composition produced by the two-step mixing in which the polyamide resin was mixed after the metal compound had been added to the polyolefin elastomer and kneaded together in advance, particularly the polyamide resin composition containing a specific amount of metal compound, is superior in durability and impulse resistance.

Example 5 did not contain hydrotalcite. Example 5 is inferior in aging resistance to Example 2, but is superior in impulse resistance, surface roughness, and appearance after extrusion to Comparative Example 4 in which mixing technique B was adopted. Examples 6 and 7 contained hydrotalcite and magnesium oxide or zinc oxide. Example 7 containing magnesium oxide is superior in breaking elongation and surface roughness to Example 6 containing zinc oxide. In Examples 9 and 10, the elastomer content is in the range of 10% to 45% by weight. From the comparison of Examples 8 to 10 with Comparative Examples 5 to 7, it is found that mixing technique A is more effective than mixing technique B. Example 8 did not contain an acid-modified elastomer. Compositions containing both an elastomer and an acid-modified elastomer produce better results.

While the present invention has been described with reference to specific embodiments, it is to be understood by those skilled in the art that various modifications may be made without departing from the intention and scope of the invention.

This application claims the benefit of Japanese Patent Application No. 2009-079487 filed on Mar. 27, 2009, Japanese Patent Application No. 2009-130622 filed on May 29, 2009, Japanese Patent Application No. 2009-133251 filed on Jun. 2, 2009, and Japanese Patent Application No. 2009-170210 filed on Jul. 21, 2009, which are hereby incorporated by reference herein in their entirety.

The invention claimed is:

1. A refrigerant transporting hose comprising a gas barrier layer made of a polyamide resin composition,
    wherein the polyamide resin composition contains at least one metal compound selected from the group consisting of hydroxides, oxides and carbonates of divalent and trivalent metals in an amount of 1% to 15% by weight relative to the total amount of the metal compound and the polymer component, wherein the polyamide resin composition contains a polyolefin elastomer, and at least part of the polyolefin elastomer is modified with an acid, wherein the refrigerant transporting hose includes an inner resin layer having a three-layer structure including, from the inner side, an acid-modified fluororesin layer, the polyamide resin layer and a polyamide/polyolefin elastomer composite resin layer.

2. The refrigerant transporting hose according to claim 1, wherein the metal compound is hydrotalcite or hydrotalcite and a metal compound other than hydrotalcite.

3. The refrigerant transporting hose according to claim 2, wherein the metal compound other than hydrotalcite is magnesium oxide.

4. The refrigerant transporting hose according to claim 2, wherein the metal compound is (a) hydrotalcite and (b) a metal compound other than hydrotalcite, and the contents of (a) hydrotalcite and (b) metal compound in the polyamide resin composition are each 0.5% to 10% by weight relative to the polymer component, and the weight ratio of (a) hydrotalcite to (b) metal compound ((a) hydrotalcite: (b) metal compound) is 80:20 to 50:50.

5. The refrigerant transporting hose according to claim 1, wherein the polyolefin elastomer content in the polyamide resin composition is 10% to 45% by weight relative to the total weight of the polyamide resin composition.

6. The refrigerant transporting hose according to claim 1, wherein the acid-modified fluororesin layer has a thickness of 100 μm or less, the polyamide resin layer has a thickness of 100 μm or less, and the polyamide/polyolefin elastomer composite resin layer has a thickness of 50 μm or more.

7. The refrigerant transporting hose according to claim 1, wherein the acid-modified fluororesin is a fluorine-containing copolymer including a polymerization unit based on tetrafluoroethylene, a polymerization unit based on ethylene, and a polymerization unit based on itaconic anhydride and/or citraconic anhydride.

8. The refrigerant transporting hose according to claim 1, wherein the polyamide/polyolefin elastomer composite resin contains a polyamide resin and a polyolefin elastomer, and the polyolefin elastomer content is 10% to 45% by weight relative to the total weight of the polyamide/polyolefin elastomer composite resin.

9. The refrigerant transporting hose according to claim 1, wherein the polyamide/polyolefin elastomer composite resin layer contains at least one metal compound selected from the group consisting of hydroxides, oxides and basic salts of divalent and trivalent metals.

10. The refrigerant transporting hose according to claim 1, further comprising a reinforcing layer made of a reinforcing thread and a rubber sheath layer, wherein the reinforcing layer is on the outer periphery of the inner resin layer.

11. The refrigerant transporting hose according to claim 1, further comprising a reinforcing layer made of a reinforcing thread and a rubber sheath layer, wherein the reinforcing layer is on the outer periphery of the gas barrier layer.

12. A refrigerant transporting hose comprising a gas barrier layer made of a polyamide resin composition containing a polyamide resin, a polyolefin elastomer, and at least one metal compound selected from the group consisting of hydroxides, oxides and carbonates of divalent and trivalent metals produced by a method comprising:
   a first mixing step of mixing and kneading the metal compound and the polyolefin elastomer and
   a second mixing step mixing and kneading the mixture prepared in the first mixing step and the polyamide resin,
   wherein the refrigerant transporting hose includes an inner resin layer having a three-layer structure including, from the inner side, an acid-modified fluororesin layer, the polyamide resin layer and a polyamide/polyolefin elastomer composite resin layer.

13. The refrigerant transporting hose according to claim 12, further comprising a reinforcing layer made of a reinforcing thread and a rubber sheath layer, wherein the reinforcing layer is on the outer periphery of the gas barrier layer.

* * * * *